(12) United States Patent
Kuroki et al.

(10) Patent No.: US 7,504,173 B2
(45) Date of Patent: *__Mar. 17, 2009__

(54) CONSTITUENT PART FOR FUEL CELL

(75) Inventors: Yuichi Kuroki, Fujisawa (JP); Yoshihiro Kurano, Fujisawa (JP); Tomohiro Inoue, Fujisawa (JP)

(73) Assignee: NOK Corporation, Tokyo (JP)

(*) Notice: Subject to any disclaimer, the term of this patent is extended or adjusted under 35 U.S.C. 154(b) by 279 days.

This patent is subject to a terminal disclaimer.

(21) Appl. No.: 10/275,282

(22) PCT Filed: May 22, 2001

(86) PCT No.: PCT/JP01/04273

§ 371 (c)(1),
(2), (4) Date: Nov. 13, 2002

(87) PCT Pub. No.: WO02/01658

PCT Pub. Date: Jan. 3, 2002

(65) Prior Publication Data

US 2003/0104262 A1    Jun. 5, 2003

(30) Foreign Application Priority Data

Jun. 29, 2000  (JP)  .............................. 2000-195535
Oct. 6, 2000   (JP)  .............................. 2000-307152
Oct. 27, 2000  (JP)  .............................. 2000-328136
Feb. 2, 2001   (JP)  .............................. 2001-026295

(51) Int. Cl.
*H01M 8/02* (2006.01)
*H01M 2/08* (2006.01)
*H01M 4/96* (2006.01)
*H01M 4/94* (2006.01)

(52) U.S. Cl. .............................. 429/36; 429/35; 429/42; 429/44

(58) Field of Classification Search .................... 429/12, 429/34, 35, 36, 40, 42; 428/66.4; 29/623.1, 29/623.2

See application file for complete search history.

(56) References Cited

U.S. PATENT DOCUMENTS 5,464,700 A * 11/1995 Steck et al. .................... 429/30

(Continued)

FOREIGN PATENT DOCUMENTS

JP    1996-45517    2/1996

(Continued)

OTHER PUBLICATIONS

U.S. Appl. No. 10/380,465—Claims Only.*

(Continued)

*Primary Examiner*—Jonathan Crepeau
*Assistant Examiner*—Robert Hodge
(74) *Attorney, Agent, or Firm*—Jacobson Holman PLLC

(57) ABSTRACT

In order to provide a constituting part for a fuel battery in which a number of steps of assembling the constituting parts for the fuel battery can be reduced, and in which the replacing property and the maintenance property of fuel battery cell parts can be improved and the cost for parts can be reduced, the structure is made such that a separator made of a carbon plate or substantially similar material, a gas diffusion layer made of a carbon fiber or substantially similar material, and a gasket made of a liquid rubber cured material or substantially similar material are integrally formed, and further, gaskets are respectively provided on both surfaces of a pair of gas diffusion layers holding an independent electrolyte membrane from both sides thereof between the pair.

1 Claim, 15 Drawing Sheets

U.S. PATENT DOCUMENTS

| | | | |
|---|---|---|---|
| 6,057,054 A * | 5/2000 | Barton et al. | 429/42 |
| 6,316,139 B1 * | 11/2001 | Uchida et al. | 429/36 |
| 6,337,120 B1 * | 1/2002 | Sasaki et al. | 428/66.4 |
| 7,063,911 B1 * | 6/2006 | Nagai et al. | 429/35 |
| 2001/0019790 A1 * | 9/2001 | Regan et al. | 429/35 |

FOREIGN PATENT DOCUMENTS

| | | | |
|---|---|---|---|
| JP | 1998-55813 | | 2/1998 |
| JP | 2000-133288 | | 5/2000 |
| JP | 2000133288 A | * | 5/2000 |
| JP | 2001-510932 | | 8/2001 |
| WO | WO 0104983 A1 | * | 1/2001 |

OTHER PUBLICATIONS

Official English Translation of WO 01/04983.*

* cited by examiner

CONSTITUENT PART FOR FUEL CELL

This is a nationalization of PCT/JP01/04273, filed May 22, 2001 and published in Japanese.

TECHNICAL FIELD

The present invention relates to a constituting part for a fuel battery forming an assembly of constituting elements for the fuel battery.

BACKGROUND OF THE INVENTION

As shown in FIG. 15, the fuel battery has a separator (collector electrode) 51 constituted by a carbon plate or the like, a reaction electrode portion (MEA) 52 constituted by an integrated product of an electrode with catalyst (catalyst layer) carrying a Pt catalyst and an electrolyte membrane (ion exchange membrane), for reacting a gas, a gas diffusion layer (GDL) 53 made of a carbon fiber or the like for promoting a diffusion of gas, and a gasket (seal) 54 for sealing the gas or a refrigerant, as main constituting elements.

However, in the prior art, since the structure is made such that these constituting elements are sequentially assembled during the assembly of the fuel battery, there is a problem that a lot of labor and time are required for the assembly.

Further, in recent days, there has been invented an integrally molded product of the separator 51 and the gasket 54 in which the gasket is integrally formed on the carbon plate (refer to Japanese Unexamined Patent Publication No. 2000-133288), and in accordance with this prior art, it is possible to reduce the man-hour required for assembling the separator 51 with the gasket 54. However, there is still a problem that many man-hours are required for assembling the other parts such as the gas diffusion layer 53 and the like. The gas diffusion layer 53 is generally made of the carbon fiber, and cannot be bonded to the carbon plate. Accordingly, it is hard to position at the time of assembling, and a device for positioning or the like is required.

Further, in the prior art, as shown in FIG. 16, since the gas diffusion layers 53 are in a state of being inserted within the separators 51 in the case of assembling the separators 51 and the gas diffusion layers 53 as independent members, spaces 55 are left in a periphery of the gas diffusion layers 53. Accordingly, since the spaces 55 form a shortcut flow passage of the gas so as to prevent the gas from being diffused, there is a problem that an efficiency of power generation of the fuel battery is reduced for the reason thereof.

Further, since the gas diffusion layer is a porous body made of a carbon fiber or substantially similar material, a void portion of the gas diffusion layer forms a flow passage for gas leakage from an inner gas flow passage side toward outer side with respect to the gasket at the time of laminating the gasket on the gas diffusion layer to seal it. Therefore, there is a problem that the gas may be leaked. Further, although portions between the gas diffusion layer, and the gasket and the separator are pressurized to be sealed, there is the risk that a part of the gas diffusion layer is crushed or broken.

Further, as shown in FIGS. 17 and 18, in another prior art, a peripheral edge portion of an electrolyte membrane (ion exchange membrane) 62 in a reaction electrode portion (MEA) 61 in which gas diffusion layers (GDL) 64 are fixed to both surfaces is formed so as to be extended in a plane direction. Seal 65, such as packings or the like, are arranged on both surfaces of the peripheral edge portion, whereby a seal portion of a fuel battery cell is constituted. The reaction electrode portion 61 is formed by integrating the electrolyte membrane 62 with electrodes with catalyst (catalyst layers) 63 arranged on both surfaces thereof. A UEA 66 is constituted by the reaction electrode portion 61 and the gas diffusion layers 64 fixed to both surfaces thereof. The UEA 66 is inserted and held between a pair of separators (collector electrodes) 67, whereby the fuel battery cell is constituted. Among the constituting elements mentioned above, since the gas diffusion layers 64 are a porous bodies made of a carbon fiber, a metal fiber or the like, and are mounted between a pair of separators 67 so as to be compressed in an assembled state, a permanent strain is easily generated.

However, in this prior art, since the gas diffusion layers 64 are fixed to the reaction electrode portion 61 as mentioned above, it is necessary to exchange the whole of the UEA 66 when a replacement is actually required. Therefore, the cost is widely increased because the electrolyte membrane 62 corresponding to a comparatively expensive part is included therein.

The present invention is made by taking the above matters into consideration, and an object of the present invention is to provide a constituting part for a fuel battery which can reduce the man-hour for assembling constituting elements for the fuel battery. In addition, another object of the present invention is to provide a constituting part for a fuel battery which can improve efficiency of power generation of the fuel battery, and can achieve excellent sealing property.

Further, another object of the present invention is to provide a constituting part for a fuel battery which can improve replacing property and maintenance property of the constituting elements for the fuel battery and can restrict parts cost.

Further, in addition thereto, another object of the present invention is to provide a constituting part for a fuel battery which can restrict a permanent compression strain generated in the gasket to a comparatively small level, in an integrated product of the gas diffusion layer and the gasket or an integrated product of the gas diffusion layer, the gasket and the separator.

In order to achieve the objects mentioned above, in accordance with a first aspect of the present invention, there is provided a constituting part for a fuel battery characterized in that a separator made of a carbon plate or the like, a gas diffusion layer made of a carbon fiber or the like, and a gasket made of a liquid rubber cured material or the like are integrally formed.

Further, in accordance with a second aspect of the present invention, there is provided a constituting part for a fuel battery characterized in that there is provided an integrated product of a separator made of a carbon plate or the like and a gas diffusion layer made of a carbon fiber or the like, and a gasket made of a liquid rubber cured material or the like is integrally formed on one surface in the side of the gas diffusion layer of the integrated product.

Further, in accordance with a third aspect of the present invention, there is provided a constituting part for a fuel battery characterized in that there is provided an integrated product of a separator made of a carbon plate or the like and a gas diffusion layer made of a carbon fiber or the like, a gasket made of a liquid rubber cured material or the like is integrally formed on one surface in the side of the gas diffusion layer of the integral product, and a gasket is also integrally formed on the opposite side surface.

Further, in accordance with a fourth aspect of the present invention, there is provided a constituting part for a fuel battery as recited in the first aspect, the second aspect or the third aspect mentioned above characterized in that an adhesive agent is applied to the separator, and a rubber of the gasket permeating into the gas diffusion layer is reacted with the adhesive agent on the separator, thereby being integrally formed in such a manner as to hold the gas diffusion layer therein.

Further, in accordance with a fifth aspect of the present invention, there is provided a constituting part for a fuel battery as recited in the first aspect, the second aspect or the third aspect mentioned above characterized in that an adhesive agent is applied to one surface of the separator, a rubber of the gasket permeating into the gas diffusion layer is reacted with the adhesive agent on the separator, thereby being integrally formed in such a manner as to hold the gas diffusion layer therein, and an adhesive agent is also applied to the opposite side surface, whereby the gaskets are integrally formed.

Further, in accordance with a sixth aspect of the present invention, there is provided a constituting part for a fuel battery as recited in the first aspect, the second aspect or the third aspect mentioned above characterized in that a through hole is provided in the separator, and a part of a rubber penetrating into the gas diffusion layer passes through the through hole so as to reach the opposite side surface, whereby the gaskets are integrally formed on both surfaces of the separator.

Further, in accordance with a seventh aspect of the present invention, there is provided a constituting part for a fuel battery characterized in that gaskets are provided on both surfaces of a pair of gas diffusion layers holding an independent electrolyte membrane from both sides thereof between the pair.

Further, in accordance with an eighth aspect of the present invention, there is provided a constituting part for a fuel battery as recited in the seventh aspect mentioned above characterized in that the gaskets have a double lip structure on the side of the separator in one gas diffusion layer, and on the side of the electrolyte membrane and side of the separator in another gas diffusion layer, and the gasket has a flat seal structure on the side of the electrolyte membrane in one gas diffusion layer.

Further, in accordance with a ninth aspect of the present invention, there is provided a constituting part for a fuel battery as recited in the seventh aspect or the eighth aspect mentioned above characterized in that each of the gaskets is structured such that a porous structure of the gas diffusion layer is impregnated with a liquid rubber.

Further, in accordance with a tenth aspect of the present invention, there is provided a constituting part for a fuel battery characterized in that through holes are provided near peripheral edge portions of a pair of gas diffusion layers holding an independent electrolyte membrane from both sides thereof between the pair, and a gaskets are integrally formed on both surfaces of the gas diffusion layers via the through holes.

Further, in accordance with an eleventh aspect of the present invention, there is provided a constituting part for a fuel battery as recited in the tenth aspect mentioned above characterized in that the gaskets cover the peripheral edge portions of the gas diffusion layers, and particularly cover end surface of the gas diffusion layers.

Further, in accordance with a twelfth aspect of the present invention, there is provided a constituting part for a fuel battery characterized in that the constituting part is an integrated product of a gas diffusion layer made of a carbon fiber or the like and a gasket made of a liquid rubber cured material or the like, and the gas diffusion layer and seal lips of the gasket are arranged so as not to be overlapped with each other in view of a plane.

Further, in accordance with a thirteenth aspect of the present invention, there is provided a constituting part for a fuel battery as recited in the twelfth aspect mentioned above characterized in that a rubber in a part of the gasket is impregnated into the gas diffusion layer in a bonding portion between the gas diffusion layer and the gasket.

Further, in accordance with a fourteenth aspect of the present invention, there is provided a constituting part for a fuel battery as recited in the twelfth aspect or the thirteenth aspect mentioned above characterized in that the gasket is a gasket for double-face seal or a gasket for one-face seal.

Further, in accordance with a fifteenth aspect of the present invention, there is provided a constituting part for a fuel battery as recited in the twelfth aspect, thirteenth aspect or the fourteenth aspect mentioned above characterized in that a separator made of a carbon plate or the like is further integrally formed with the gas diffusion layer and the gasket.

When the separator, the gas diffusion layer and the gasket are integrally formed as in the constituting part for the fuel battery in accordance with the first aspect of the present invention provided with the structure mentioned above, or the gasket is integrally formed with one surface in the side of the gas diffusion layer of the integrated product constituted by the separator and the gas diffusion layer as in the constituting part for the fuel battery in accordance with the second aspect or the third aspect of the present invention, these parts are previously integrated, so that it is possible to reduce steps of assembling these parts with each other at a time of assembling of the fuel battery.

Further, in addition, in the constituting part for the fuel battery in accordance with the third aspect of the present invention, since the gasket is also integrally formed on the opposite surface of the integrated product constituted by the separator and the gas diffusion layer, the integrated product having gaskets on both surfaces is constructed.

Further, in the constituting part for the fuel battery in accordance with the fourth aspect, fifth aspect or the sixth aspect provided with the structure mentioned above, since the rubber of the gasket permeates into the gas diffusion layer and is integrally formed in such a manner as to hold the gas diffusion layer therein, the gasket and the gas diffusion layer are closely attached to each other, so that it is possible to prevent the space forming the shortcut flow passage of the gas from being formed between the both elements.

Further, since the rubber of the gasket permeates into the gas diffusion layer and reaches the separator, whereby the gasket and the separator are integrated, it is possible to prevent the gas leakage flow passage from being formed.

Further, in addition thereto, in the constituting part for the fuel battery in accordance with the fifth aspect of the present invention, since the adhesive agent is also applied to the opposite surface of the separator, whereby the gasket is integrally formed, or in the constituting part for the fuel battery in accordance with the sixth aspect of the present invention, a part of the rubber passes through the through hole so as to reach the opposite surface, whereby the gasket is integrally formed, the integrated product having the gaskets on both surfaces is constructed.

In this case, in connection with the inventions in accordance with the first aspect to the sixth aspect mentioned above, the subject proposal includes the following technical matters.

That is, one invention which the present application proposes for achieving the object mentioned above relates to an integrated product of a carbon plate, a gas diffusion layer and a gasket for a fuel battery, in which the carbon plate used in a separator for the fuel battery, the gas diffusion layer made of a carbon fiber or the like, and the gasket corresponding to a liquid rubber cured material are integrated.

Further, the subject application also proposes the following technical matters for the purpose of achieving the objects mentioned above.

① An integrated product of a carbon plate, a gas diffusion layer and a gasket for a fuel battery, in which the carbon plate used in a separator for the fuel battery, the gas diffusion layer made of a carbon fiber or the like, and the gasket corresponding to a liquid rubber cured material are integrated.

② An integrated product of a carbon plate, a gas diffusion layer and a gasket for a fuel battery, in which the gasket corresponding to a liquid rubber cured material is formed on one surface in the side of the gas diffusion layer, in the integrated product of the carbon plate used in a separator for the fuel battery and the gas diffusion layer made of a carbon fiber or the like (that is, the gasket is formed only in side of an ion exchange membrane).

③ An integrated product of a carbon plate, a gas diffusion layer and double-face gaskets for a fuel battery, in which the gasket corresponding to a liquid rubber cured material is formed on one surface in the side of the gas diffusion layer, in the integrated product of the carbon plate used in a separator for the fuel battery and the gas diffusion layer made of a carbon fiber or the like (that is, the gasket is formed in the side of an ion exchange membrane), and the gasket is also formed in the side of a cooling water corresponding to the side of the carbon plate.

④ An integrated product of a carbon plate, a gas diffusion layer and a gasket for a fuel battery, in which the gasket corresponding to a liquid rubber cured material is formed on one surface in the side of the gas diffusion layer, in the integrated product of the carbon plate used in a separator for the fuel battery and the gas diffusion layer made of a carbon fiber or the like (that is, the gasket is formed only in side of an ion exchange membrane), an adhesive agent is applied to the carbon plate, and the rubber permeating into the gas diffusion layer reacts with the adhesive agent on the carbon plate, and is integrally formed in such a manner as to hold the gas diffusion layer therein.

⑤ An integrated product of a carbon plate, a gas diffusion layer and a gasket for a fuel battery, in which the gasket corresponding to a liquid rubber cured material is formed on one surface in the side of the gas diffusion layer, in the integrated product of the carbon plate used in a separator for the fuel battery and the gas diffusion layer made of a carbon fiber or the like (that is, the gasket is formed only in a side of an ion exchange membrane), an adhesive agent is applied to the carbon plate, and the rubber permeating into the gas diffusion layer reacts with the adhesive agent on the carbon plate, and is integrally formed in such a manner as to hold the gas diffusion layer therein. Further, double-face gasket type in which the adhesive agent is applied to the side of the carbon plate corresponding to the back surface, and the cured material of the liquid rubber is formed.

⑥ An integral product of a carbon plate, a gas diffusion layer and a gasket for a fuel battery, in which the gasket corresponding to a liquid rubber cured material is formed on one surface in the side of the gas diffusion layer, in the integrated product of the carbon plate used in a separator for the fuel battery and the gas diffusion layer made of a carbon fiber or the like (that is, the gasket is formed only in the side of an ion exchange membrane), through holes are provided with intervals in a place below the gasket in the carbon plate, and the rubber permeating into the gas diffusion layer passes through the through hole so as to reach a carbon plate front surface in the back side thereof, whereby the gasket is formed on both surfaces.

The proposed matters mentioned above propose a "product in which three parts comprising a separator, a gas diffusion layer and a gasket are integrated" which is not seen in the prior art. The product in which three parts comprising the separator, the gas diffusion layer and the gasket integrated is completed by integrally forming the separator and the gas diffusion layer via the rubber in accordance with one manufacturing method.

The gas diffusion layer made of the carbon fiber can be permeated with the rubber and thereafter cured. Accordingly, the permeated rubber can reach the carbon plate by applying the adhesive agent onto the carbon plate, whereby it is possible to bond the carbon plate with the rubber. At this time, the gas diffusion layer is fixed onto the carbon plate by the adhesive agent due to the permeating rubber. FIG. 2 in accordance with an embodiment described below shows a product in which the gasket is formed only in the side of the gas diffusion layer (the side of the ion exchange membrane). In this product, the gasket is bonded by the adhesive agent applied to the surface of the carbon plate during the formation. Further, FIG. 5 shows a product of a double-face gasket type in which the adhesive agent is applied to a back surface (a refrigerant surface) of the separator of the product in FIG. 2, and the gasket is formed. Further, FIG. 7 shows a product in which a through hole is provided in the carbon plate, and the gasket in the side of the gas diffusion layer and the gasket in the side of the refrigerant on the back surface thereof are fixed with no adhesive agent. In accordance with the bonded product of the separator, the gas diffusion layer and the gasket mentioned above, it is possible to save an assembling man hour of the carbon plate and the gas diffusion layer at a time of assembling of the fuel battery.

Further, in the prior art, the space existing in the periphery of the gas diffusion layer forms the shortcut flow passage of the gas so as to prevent the gas from being diffused, and the efficiency of power generation is deteriorated, however, since the space mentioned above does not exist, a diffusion of the gas is improved, and it is possible to improve an efficiency of power generation in the fuel battery.

As details of FIG. 7, it is possible to form the gasket on both surfaces of the carbon plate by providing through holes with a predetermined interval on a line in which the gasket of the carbon plate is to be formed. The rubber permeated into the gas diffusion layer reaches the front surface of the carbon plate in the back side through the through holes, whereby the gasket is formed on both surfaces. At this time, since the gasket is fixed through the through holes, it is not necessary to bond.

Then, in accordance with the structures and the operations mentioned above, the following effects can be achieved.

① It is possible to reduce an assembling man hour of the fuel battery.

② A gas diffusing property is further improved and an efficiency of power generation is improved by integrating the gas diffusion layer with the gasket.

③ In the case of the integrated product of the gas diffusion layer and the gasket of the through hole type using no adhesive agent, it is possible to save an adhesive agent applying step and it is possible to save a cost of the adhesive agent.

Further, in the constituting part for the fuel battery in accordance with the seventh aspect of the present invention provided with the structure mentioned above, since the electrolyte membrane and the gas diffusion layer are independently formed, and the gasket is provided on both surfaces of a pair of gas diffusion layers holding the independent electrolyte membrane therein from both sides thereof, it is sufficient to replace only the gas diffusion layer provided with the gasket, with leaving the electrolyte membrane independent from the gas diffusion layer, at a time of replacing the gas diffusion layer.

Further, in the constituting part for the fuel battery in accordance with the seventh aspect, in addition, the seal portion of the fuel battery cell is structured by a combination of the gas diffusion layer and the gasket, and the electrolyte membrane is received inside the seal portion. Accordingly, it is possible to reduce a plane area of the electrolyte membrane in comparison with the prior art.

Further, in addition, in the constituting part for the fuel battery in accordance with the eighth aspect provided with the structure mentioned above, since the gasket is formed in the double lip structure in the side of the separator in one gas diffusion layer, and in the side of the electrolyte membrane and the side of the separator in another gas diffusion layer, and the double lip structure has a plurality of lips, a seal performance is high. Further, since the gasket is formed in the flat seal structure in the side of the electrolyte membrane in one gas diffusion layer, it is possible to prevent the electrolyte membrane with which this is pressure contacted from being deformed.

Further, since the gas diffusion layer has the porous structure, it is preferable that the gasket integrated therewith is formed by impregnating the liquid rubber into the porous structure of the gas diffusion layer, as described in the ninth aspect.

Further, in the constituting part for the fuel battery in accordance with the tenth aspect of the present invention provided with the structure mentioned above, since the electrolyte membrane and the gas diffusion layer are independently formed, the through hole is provided near the peripheral edge portion of a pair of gas diffusion layers holding the independent electrolyte membrane therein, and the gasket is integrally formed on both surfaces of the gas diffusion layer via the through hole, it is sufficient to replace only the gas diffusion layer provided with the gasket with leaving the electrolyte membrane independent from the gas diffusion layer, at a time of replacing the gas diffusion layer.

Further in addition, in the constituting part for the fuel battery in accordance with the eleventh aspect of the present invention provided with the structure mentioned above, since the gasket covers the peripheral edge portion of the gas diffusion layer, and particularly covers the end surface of the gas diffusion layer, it is possible to prevent the sealed fluid from permeating through the gas diffusion layer so as to leak toward the end surface.

In this case, in connection with the inventions in accordance with the seventh aspect to the eleventh aspect mentioned above, the subject proposal includes the following technical matters.

① One gasket proposed by the subject application is a structure in which the MEA is sandwiched by the gaskets integrated with the GDL, corresponding to a membrane seal for a cell of a fuel battery stack.

Further, the GDL integrated gasket is constituted by a combination of a gasket A and a gasket B. The gasket A has double seal lips in the side of the separator. It has a flat seal surface in the side of the MEA. The gasket B has double beat seal lips in both of the side of the separator and the side of the MEA, and since an inner beat in the side of the MEA is structured such as to seal by holding the MEA therewith, a height of the seal lip is made lower at that degree.

Both of the gaskets A and B are made by GDL being impregnated with the liquid rubber.

② One gasket proposed by the subject application is a structure in which the problems in the existing product are solved by reducing an area of the expensive MEA, separating the GDL which is considered to be replaced due to the permanent strain, and integrating the GDL with the seal.

An integration of the GDL and the seal is achieved by a combination of two kinds of gaskets A and B, and a structure with the double seal lips, the inner side of which is mainly for fixing to the MEA and the outer side of which is for sealing, for the purpose that the seal performance is not deteriorated.

An inner side of the double lips is structured such that a height of the inner side is made lower at a thickness of the MEA by considering the thickness. A part thereof is made flat, for the purpose of improving a seal property for reducing the deformation of membrane.

A liquid rubber is used for the rubber material for the purpose of impregnation into the porous body, for example, a two-solution type liquid silicone rubber is used. Further, a liquid fluorine rubber, a liquid ethylene propylene rubber or the like may be employed.

③ One gasket proposed by the subject application is a gasket which seals between a collector electrode (separator) of the fuel battery and a reaction electrode portion, in which the gasket is integrally formed with the GDL positioned so as to hold the MEA between a pair of them.

The through hole is provided in the GDL, and the gasket is integrally formed so as to cover the end portion of the GDL.

The integral molding is executed by an LIM molding machine.

A liquid rubber material having a low hardness (Hs 20 to 60) is employed for the gasket.

④ Further, in one gasket proposed by the subject application, in order to achieve the problems in the prior art mentioned above, the UEA is separated into the MEA and the GDL, the gasket is integrated with the GDL, and the MEA can be recycled at a time of replacing the UEA due to the permanent strain of the GDL.

In forming the gasket in the GDL, since the GDL is the porous body, an impregnation of the liquid rubber can be considered, however, in order to improve a productivity, the through hole is provided in the side of the GDL, and the rubber is integrally formed there on both surfaces.

In the molding, a mold is clamped only at the periphery of the seal portion, and a clearance is provided in a mold structure so as not to compress the porous portion of the reaction surface requiring a gas diffusion function. Further, taking a leakage in the direction to the end surface of the GDL into consideration, the structure is made such that the end surface is covered by the rubber.

For the gasket material, a liquid rubber capable of executing an injection molding at a low pressure and having a rubber hardness of Hs 20 to 60 is used.

Further, when the gas diffusion layer and the seal lip of the gasket are arranged so as not to overlap with each other in a plane, as in the constituting part for the fuel battery in accordance with the twelfth aspect of the present invention provided with the structure mentioned above, the gas diffusion layer is not positioned immediately below the seal lip of the gasket, so that it is possible to restrict the permanent compression strain generated in the gasket to a comparatively small level.

In this case, in order to arrange the gas diffusion layer and the seal lip of the gasket so as not to overlap with each other in the plane as mentioned above, it is preferable that the gas diffusion layer is arranged in a side surface of the gasket, or the gasket is arranged in an outer side of the gas diffusion layer, and in order to integrate the gas diffusion layer with the gasket, it is preferable that the liquid rubber in a part of the gasket is impregnated into the gas diffusion layer in the bonding portion between the gas diffusion layer and the gasket (the thirteenth aspect).

Further, the gasket includes the gasket having the seals on both surfaces provided with the seal lips in both of the upper and lower surfaces, and the gasket having the seal on one surface provided with the seal lip in any one of both of the upper and lower surfaces (the fourteenth aspect), and there is a case that the separator made of the carbon plate or the like is integrally formed with the gas diffusion layer and the gasket (the fifteenth aspect).

Further, in connection with the inventions in accordance with the twelfth aspect to the fifteenth aspect mentioned above, in order to achieve the objects mentioned above, the subject proposal includes the following technical matters.

① An integrated product of a gas diffusion layer and a gasket for a fuel battery, in which the gas diffusion layer made of a carbon fiber or the like used for the fuel battery and the gasket corresponding to a cured material of a liquid rubber are integrally formed, and in which the gas diffusion layer is not positioned immediately below a lip of the gasket, and the gas diffusion layer is fixed to a side surface of the gasket.

② An integrated product of a gas diffusion layer and a gasket for a fuel battery, in which the gas diffusion layer made of a carbon fiber or the like used for the fuel battery and the gasket corresponding to a cured material of a liquid rubber are integrally formed, and in which the gaskets are formed on both surface with respect to the gas diffusion layer, however, the gas diffusion layer is not positioned immediately below a lip of the gasket, and the gas diffusion layer is fixed to a side surface of the gasket.

③ An integrated product of a gas diffusion layer and a gasket for a fuel battery, in which the gas diffusion layer made of a carbon fiber or the like used for the fuel battery and the gasket corresponding to a cured material of a liquid rubber are integrally formed, and in which the gas diffusion layer is not positioned immediately below a lip of the gasket, and the gas diffusion layer is fixed to a side surface of the gasket, wherein a bonding portion between the gasket and the gas diffusion layer is in a state that the gas diffusion layer is impregnated with the rubber.

④ An integrated product of a gas diffusion layer and a gasket for a fuel battery, in which the gas diffusion layer made of a carbon fiber or the like used for the fuel battery and the gasket corresponding to a cured material of a liquid rubber are integrally formed, and in which the gaskets are formed on both surfaces with respect to the gas diffusion layer, however, the gas diffusion layer is not positioned immediately below a lip of the gasket, and the gas diffusion layer is fixed to a side surface of the gasket, wherein a bonding portion between the gasket and the gas diffusion layer is in a state that the gas diffusion layer is impregnated with the rubber.

⑤ An integrated product of a carbon plate, a gas diffusion layer and a gasket for a fuel battery, in which the carbon plate used in a separator for the fuel battery, the gas diffusion layer made of a carbon fiber or the like and the gasket corresponding to a cured material of a liquid rubber are integrally formed, and in which the gas diffusion layer is not positioned immediately below a lip of the gasket, and the gas diffusion layer is fixed to a side surface of the gasket.

⑥ An integrated product of a carbon plate, a gas diffusion layer and a gasket for a fuel battery, in which the carbon plate used in a separator for the fuel battery, the gas diffusion layer made of a carbon fiber or the like and the gasket corresponding to a cured material of a liquid rubber are integrally formed, and in which the gas diffusion layer is not positioned immediately below a lip of the gasket, and the gas diffusion layer is fixed to a side surface of the gasket, wherein a bonding portion between the gasket and the gas diffusion layer is in a state that the gas diffusion layer is impregnated with the rubber.

⑦ An integrated product of a carbon plate, a gas diffusion layer and a gasket for a fuel battery, in which the gasket corresponding to a cured material of a liquid rubber is formed on one surface in the side of the gas diffusion layer of an integrated product of the carbon plate used in a separator for the fuel battery and the gas diffusion layer made of a carbon fiber or the like (that is, the gasket is formed only in the side of an ion exchange membrane), and in which the gas diffusion layer is not positioned immediately below a lip of the gasket, and the gas diffusion layer is fixed to a side surface of the gasket.

⑧ An integrated product of a carbon plate, a gas diffusion layer and a gasket for a fuel battery, in which the gasket corresponding to a cured material of a liquid rubber is formed on one surface in the side of the gas diffusion layer of an integrated product of the carbon plate used in a separator for the fuel battery and the gas diffusion layer made of a carbon fiber or the like (that is, the gasket is formed only in the side of an ion exchange membrane), and in which the gas diffusion layer is not positioned immediately below a lip of the gasket, and the gas diffusion layer is fixed to a side surface of the gasket, wherein a bonding portion between the gasket and the gas diffusion layer is in a state that the gas diffusion layer is impregnated with the rubber.

⑨ An integrated product of a carbon plate, a gas diffusion layer and gaskets on both surfaces for a fuel battery, in which the gasket corresponding to a cured material of a liquid rubber is formed on one surface in the side of the gas diffusion layer of an integrated product of the carbon plate used in a separator for the fuel battery and the gas diffusion layer made of a carbon fiber or the like (that is, the gasket is formed only in the side of an ion exchange membrane), and the gasket is also formed in the side of a cooling water corresponding to the side of the carbon plate, and in which the gas diffusion layer is not positioned immediately below a lip of the gasket, and the gas diffusion layer is fixed to a side surface of the gasket.

⑩ An integrated product of a carbon plate, a gas diffusion layer and a gasket for a fuel battery, in which the gasket corresponding to a cured material of a liquid rubber is formed on one surface in the side of the gas diffusion layer of an integrated product of the carbon plate used in a separator for the fuel battery and the gas diffusion layer made of a carbon fiber or the like (that is, the gasket is formed only in the side of an ion exchange membrane), and in which an adhesive agent is applied to the carbon plate, and a rubber permeated into the gas diffusion layer reacts with the adhesive agent on the carbon plate so as to be integrally formed in such a manner as to hold the gas diffusion layer therein, wherein a bonding portion between the gasket and the gas diffusion layer is in a state that the gas diffusion layer is impregnated with the rubber.

⑪ An integrated product of a carbon plate, a gas diffusion layer and a gasket for a fuel battery, in which the gasket corresponding to a cured material of a liquid rubber is formed on one surface in the side of the gas diffusion layer of an integrated product of the carbon plate used in a separator for the fuel battery and the gas diffusion layer made of a carbon fiber or the like (that is, the gasket is formed only in the side of an ion exchange membrane). An adhesive agent is applied to the carbon plate, and the gasket reacts with the adhesive agent on the carbon plate, whereby the gasket and the carbon plate are integrally formed. At the same time, the gas diffusion layer which is not positioned immediately below the gasket and is positioned in a side surface is fixed by the gasket. An adhesive agent is also applied to the side of the carbon plate corresponding to the back surface thereof, and a cured material of a liquid rubber is formed, whereby a double-face gasket type is made.

(12) An integrated product of a carbon plate, a gas diffusion layer and a gasket for a fuel battery, in which the gasket corresponding to a cured material of a liquid rubber is formed on one surface in the side of the gas diffusion layer of an integrated product of the carbon plate used in a separator for the fuel battery and the gas diffusion layer made of a carbon fiber or the like (that is, the gasket is formed only in the side of an ion exchange membrane). An adhesive agent is applied to the carbon plate, and the gasket reacts with the adhesive agent on the carbon plate, whereby the gasket and the carbon plate are integrally formed. At the same time, the gas diffusion layer which is not positioned immediately below the gasket and is positioned in a side surface is impregnated with the rubber, and the gas diffusion layer is fixed by the gasket. An adhesive agent is also applied to the side of the carbon plate corresponding to the back surface thereof, and a cured material of a liquid rubber is formed, whereby a double-face gasket type is made.

(13) An integrated product of a carbon plate used in a separator for a fuel battery and a gas diffusion layer made of a carbon fiber or the like, in which through holes are provided with intervals immediately below the gasket in the carbon plate, the gasket is formed on both surfaces of the carbon plate through the through holes, and simultaneously the gas diffusion layer which is not positioned immediately below the gasket but is positioned in a side surface is fixed. There is provided an integrated product of the carbon plate, the gas diffusion layer and the gasket for the fuel battery which is manufactured without using an adhesive agent.

(14) An integrated product of a carbon plate used in a separator for a fuel battery and a gas diffusion layer made of a carbon fiber or the like, in which through holes are provided with intervals immediately below the gasket in the carbon plate, the gasket is formed on both surfaces of the carbon plate through the through holes, and simultaneously the gas diffusion layer which is not positioned immediately below the gasket but is positioned in a side surface is impregnated with a rubber, and the gas diffusion layer is fixed by the gasket. There is provided an integrated product of the carbon plate, the gas diffusion layer and the gasket for the fuel battery which is manufactured without using an adhesive agent.

As mentioned above, for example, in the product in which the gas diffusion layer made of the carbon fiber or the like used in the separator for the fuel battery, and the gasket corresponding to the cured material of the liquid rubber are integrally formed, or in the product in which the carbon plate, the gas diffusion layer made of the carbon fiber or the like, and the gasket corresponding to the cured material of the liquid rubber are integrally formed, when the gas diffusion layer does not exist immediately below the gasket, the gas diffusion layer is positioned in the side surface of the gasket, and the gas diffusion layer is impregnated with the rubber so as to be fixed to the gasket, it is possible to restrict the permanent compression strain generated in the gasket to a small level because the gas diffusion layer is not positioned immediately below the gasket.

BEST MODE FOR CARRYING OUT THE INVENTION

Next, a description will be given of embodiments in accordance with the present invention with reference to the accompanying drawings.

First Embodiment

Figure 1:
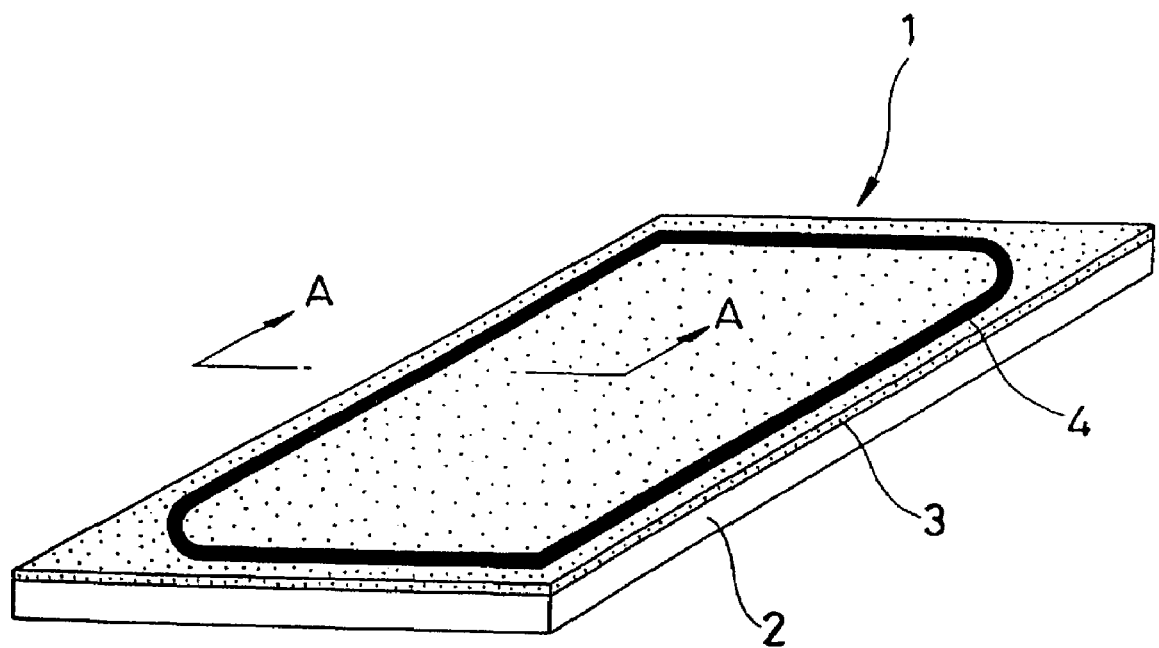
FIG. 1 is a schematic perspective view of a constituting part for a fuel battery in accordance with a first embodiment of the present invention.
Figure 2:
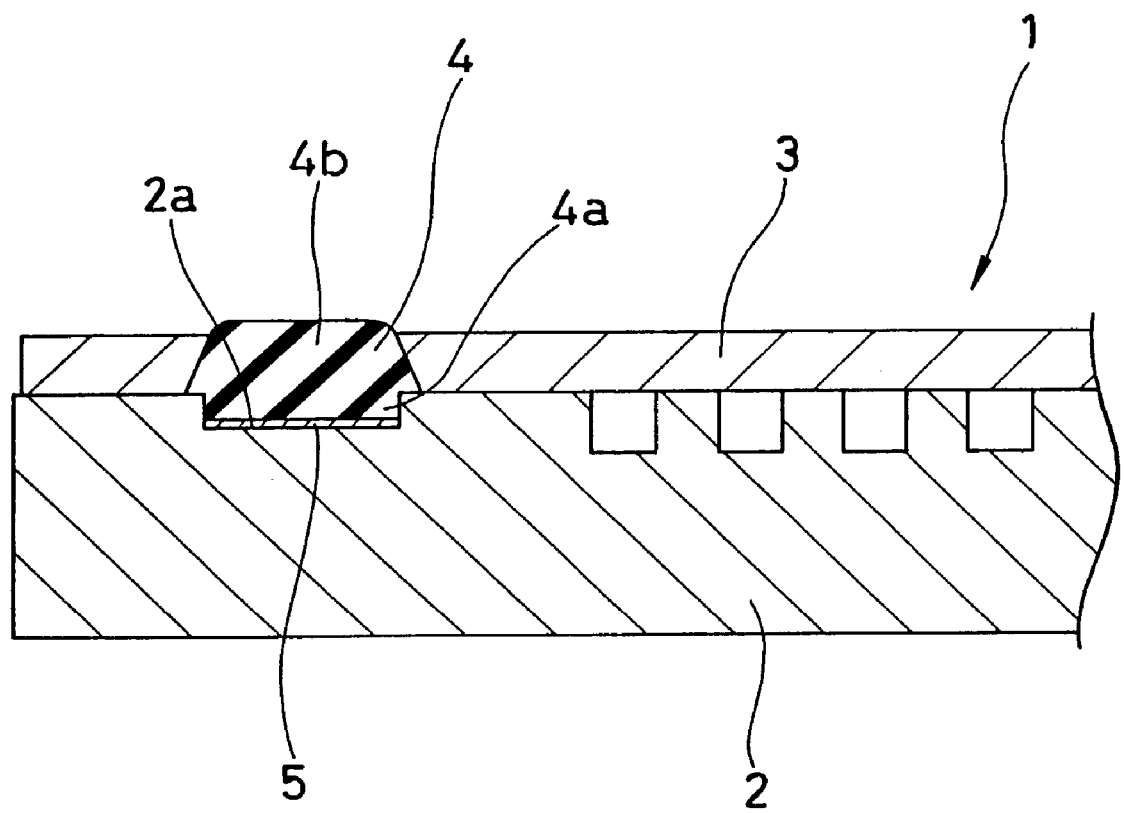
FIG. 2 is a cross sectional view along a line A-A in FIG. 1.
Figure 3:
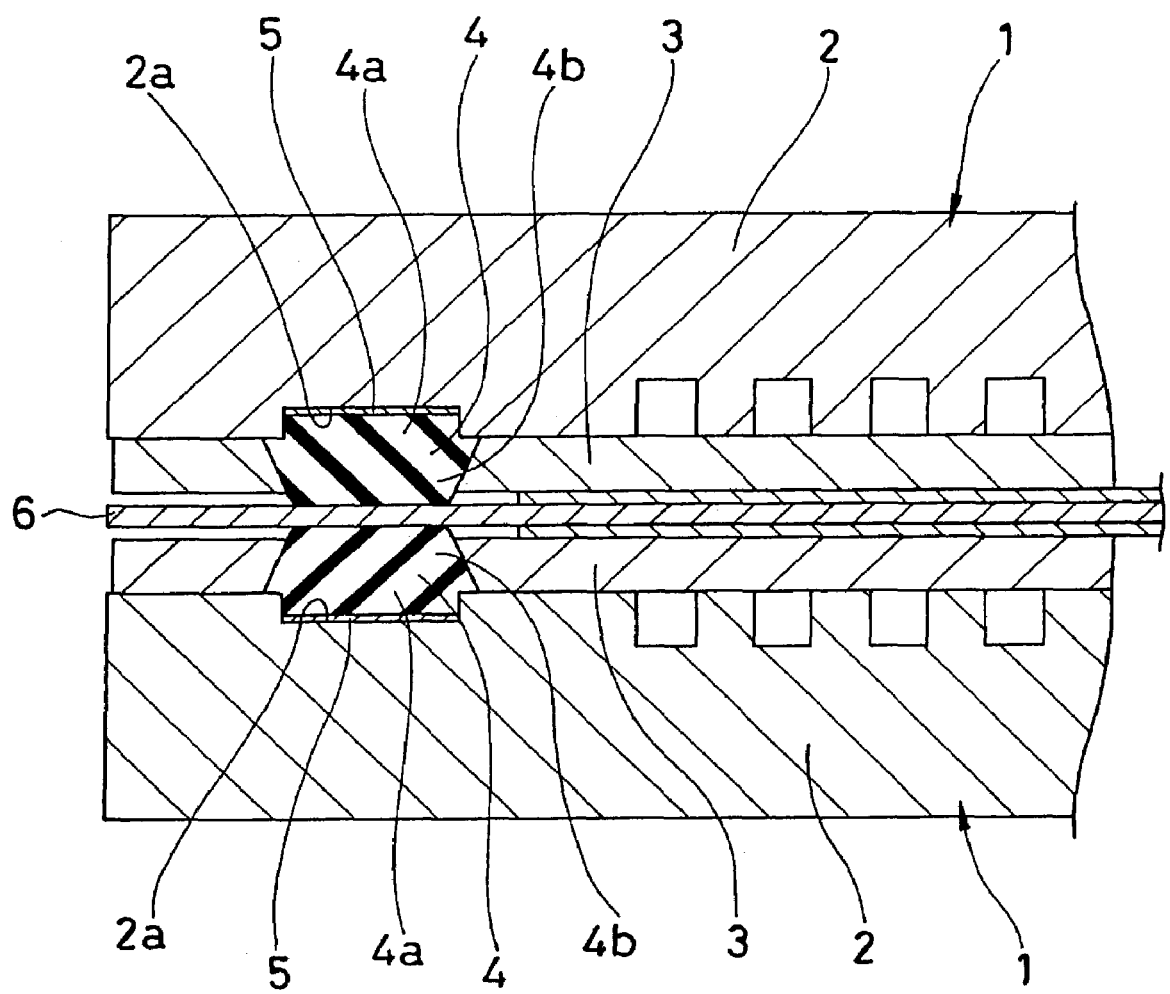
FIG. 3 is a schematic perspective view showing an assembling state of the constituting part for the fuel battery.

FIG. 1 shows a schematic perspective view of a constituting part 1 for a fuel battery (separator for a fuel battery) in accordance with a first embodiment of the present invention, and a cross sectional view along a line A-A thereof is shown in FIG. 2. Further, FIG. 3 shows a cross sectional view of an assembling state of the constituting part 1 for the fuel battery. Further, reference numeral 6 in FIG. 3 denotes a reaction electrode portion (MEA: Membrane Electrode Assembly) assembled with the constituting part 1 for the fuel battery.

The constituting part 1 for the fuel battery in accordance with the present embodiment is structured in the following manner.

That is, at first, a separator (separator main body) 2 constituted by a carbon plate having a predetermined thickness is provided, and a gas diffusion layer 3 made of a carbon fiber and a gasket 4 made of a liquid rubber cured material are integrally formed with one surface of the separator 2.

The gasket 4 is integrally provided with a flat base portion 4a received in a receiving groove 2a provided on one surface of the separator 2, and a lip portion 4b having a substantially trapezoidal cross sectional shape and integrally formed with the base portion 4a, and is integrated with the separator 2 so as to hold the gas diffusion layer 3 with the separator 2 in accordance that the liquid rubber of the gasket 4 impregnated into the carbon fiber of the gas diffusion layer 3 reacts with an adhesive agent 5 which is previously applied to an inner surface of the receiving groove 2a so as to be solidified, at an immediately upper position of the receiving groove 2a.

Further, the gas diffusion layer 3 is integrated with the separator 2 so as to be held between the gasket 4 and the separator 2 in accordance that the liquid rubber of the gasket 4 impregnated into the carbon fiber of the gas diffusion layer 3 reacts with the adhesive agent 5 within the receiving groove 2a so as to be solidified, at the immediately upper position of the receiving groove 2a.

The gas diffusion layer 3 is formed in a flat shape having substantially the same size and the same shape as those of the separator 2, and an upper surface of a lip portion 4b of the gasket 4 is formed so as to protrude outward from the gas diffusion layer 3.

In the constituting part 1 for the fuel battery, since the separator 2 constituted by the carbon plate, the gas diffusion layer 3 made of the carbon fiber, and the gasket 4 made of the liquid rubber cured material are integrally formed with each other as mentioned above, it is possible to reduce steps of assembling these parts with each other at a time of assembling of the fuel battery.

Further, since the liquid rubber forming the gasket 4 is impregnated into the carbon fiber of the gas diffusion layer 3 so as to react with the adhesive agent 5 within the receiving groove 2a and solidify, thereby being integrally formed with the separator 2 so as to hold the gas diffusion layer 3, there is provided a structure in which the gasket 4 and the gas diffusion layer 3 are closely attached. Accordingly, it is possible to prevent the space forming the shortcut flow passage for the gas which is formed in the prior art mentioned above, from being formed between the gasket 4 and the gas diffusion layer 3.

Further, since the liquid rubber forming the gasket 4 is impregnated into the carbon fiber of the gas diffusion layer 3 so as to reach the separator 2, whereby the gasket 4 and the separator 2 are directly integrally formed, it is possible to prevent the gas leakage flow passage from being formed between the both elements 2 and 4.

Second Embodiment

Figure 4:
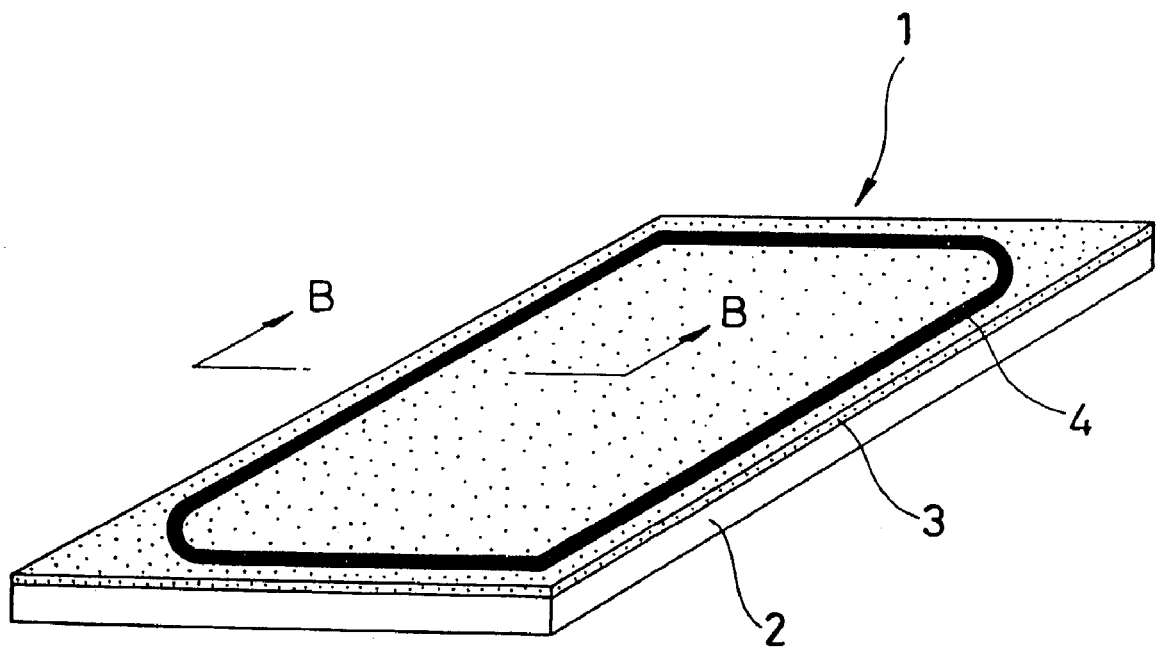
FIG. 4 is a schematic perspective view of a constituting part for a fuel battery in accordance with a second embodiment of the present invention.
Figure 5:
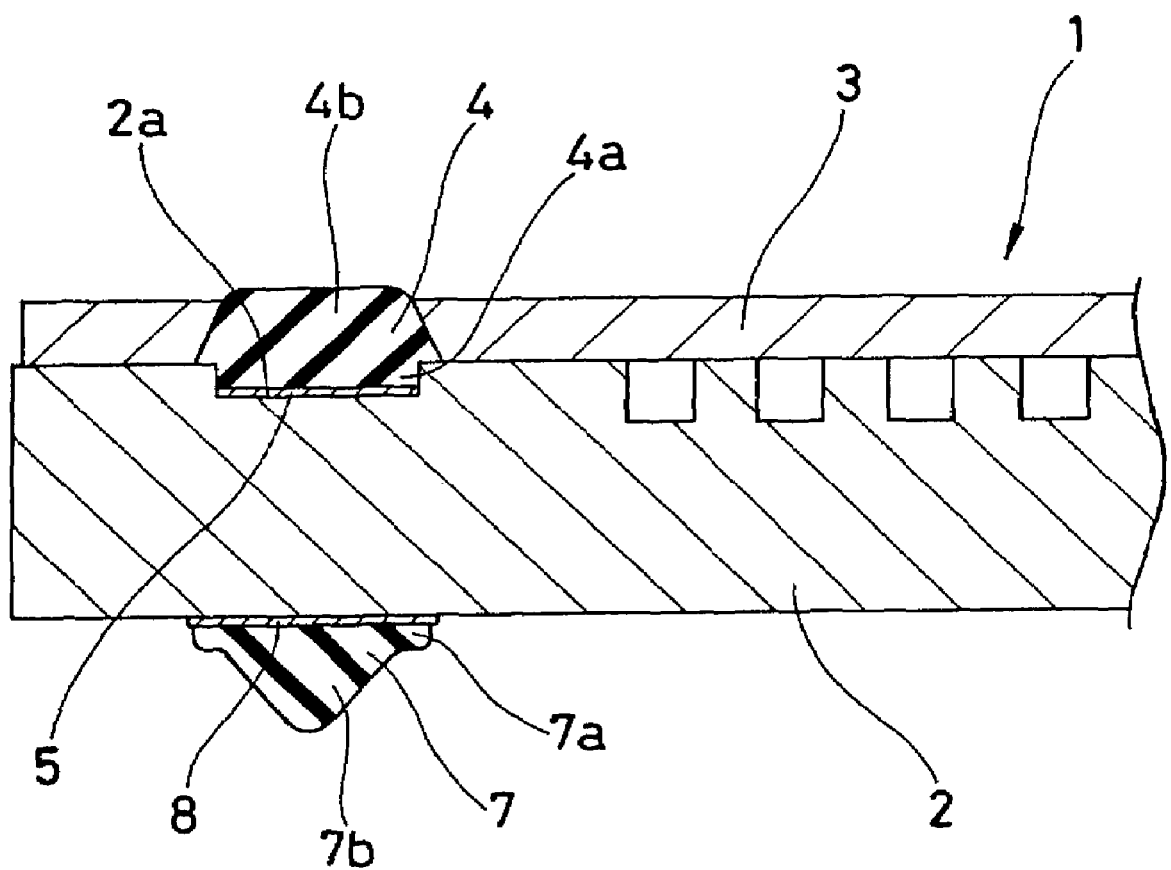
FIG. 5 is a cross sectional view along a line B-B in FIG. 4.

FIG. 4 shows a schematic perspective view of a constituting part 1 for a fuel battery (separator for a fuel battery) in accordance with a second embodiment of the present invention, and a cross sectional view along a line B-B thereof is shown in FIG. 5.

The constituting part 1 for the fuel battery in accordance with the present embodiment is structured in the following manner.

That is, at first, a separator (separator main body) 2 constituted by a carbon plate having a predetermined thickness is provided, a gas diffusion layer 3 made of a carbon fiber and a gasket 4 made of a liquid rubber cured material are integrally formed with one surface of the separator 2, and a gasket 7 made of a liquid rubber cured material is integrally formed with an opposite surface of the separator 2.

One gasket 4 provided on one surface of the separator 2 is integrally provided with a flat base portion 4a received in a receiving groove 2a provided on one surface of the separator 2, and a lip portion 4b having a substantially trapezoidal cross sectional shape and integrally formed with the base portion 4a, and is integrated with the separator 2 so as to hold the gas diffusion layer 3 with the separator 2 in accordance that the liquid rubber of the gasket 4 impregnated into the carbon fiber of the gas diffusion layer 3 reacts with an adhesive agent 5 which is previously applied to an inner surface of the receiving groove 2a so as to solidify, at an immediately upper position of the receiving groove 2a.

Further, the gas diffusion layer 3 is integrated with the separator 2 so as to be held between the gasket 4 and the separator 2 in accordance that the liquid rubber of the gasket 4 impregnated into the carbon fiber of the gas diffusion layer 3 reacts with the adhesive agent 5 within the receiving groove 2a so as to solidify, at the immediately upper position of the receiving groove 2a.

The gas diffusion layer 3 is formed in a flat shape having substantially the same size and the same shape as those of the separator 2, and an upper surface of a lip portion 4b of the gasket 4 is formed so as to protrude outward from the gas diffusion layer 3.

Further, another gasket 7 provided on the opposite surface of the separator 2 is integrally provided with a flat base portion 7a, and a lip portion 4b having a substantially triangular cross sectional shape and integrally formed with the base portion 7a, and is integrated with the separator 2 by an adhesive agent 8 applied to the opposite surface of the separator 2.

In the constituting part 1 for the fuel battery, since the separator 2 constituted by the carbon plate, the gas diffusion layer 3 made of the carbon fiber, and a pair of gaskets 4 and 7 made of the liquid rubber cured material are integrally formed with each other as mentioned above, it is possible to reduce steps of assembling these parts with each other at a time of assembling of the fuel battery.

Further, since the liquid rubber forming one gasket 4 is impregnated into the carbon fiber of the gas diffusion layer 3 so as to react with the adhesive agent 5 within the receiving groove 2a and solidify, thereby being integrally formed with the separator 2 so as to hold the gas diffusion layer 3, there is provided a structure in which the gasket 4 and the gas diffusion layer 3 are closely attached. Accordingly, it is possible to prevent the space forming the shortcut flow passage for the gas, which is formed in the prior art mentioned above, from being formed between the gasket 4 and the gas diffusion layer 3.

Further, since the liquid rubber forming one gasket 4 is impregnated into the carbon fiber of the gas diffusion layer 3 so as to reach the separator 2, whereby the gasket 4 and the separator 2 are directly integrally formed, it is possible to prevent the gas leakage flow passage from being formed between the both elements 2 and 4.

Third Embodiment

Figure 6:
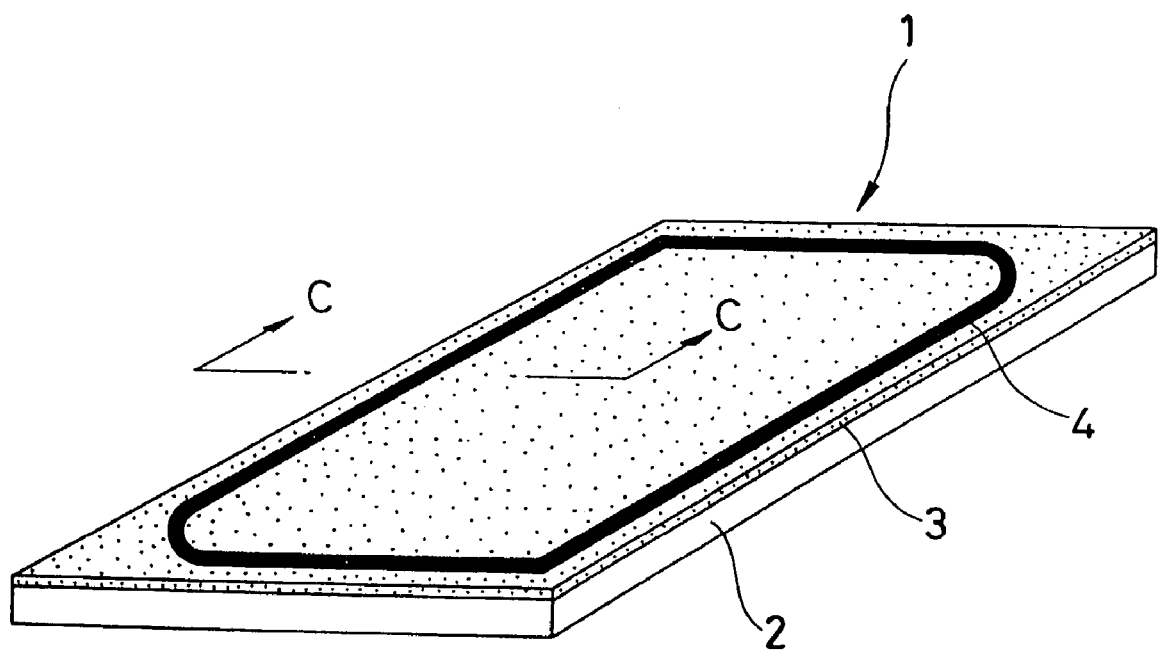
FIG. 6 is a schematic perspective view of a constituting part for a fuel battery in accordance with a third embodiment of the present invention.
Figure 7:
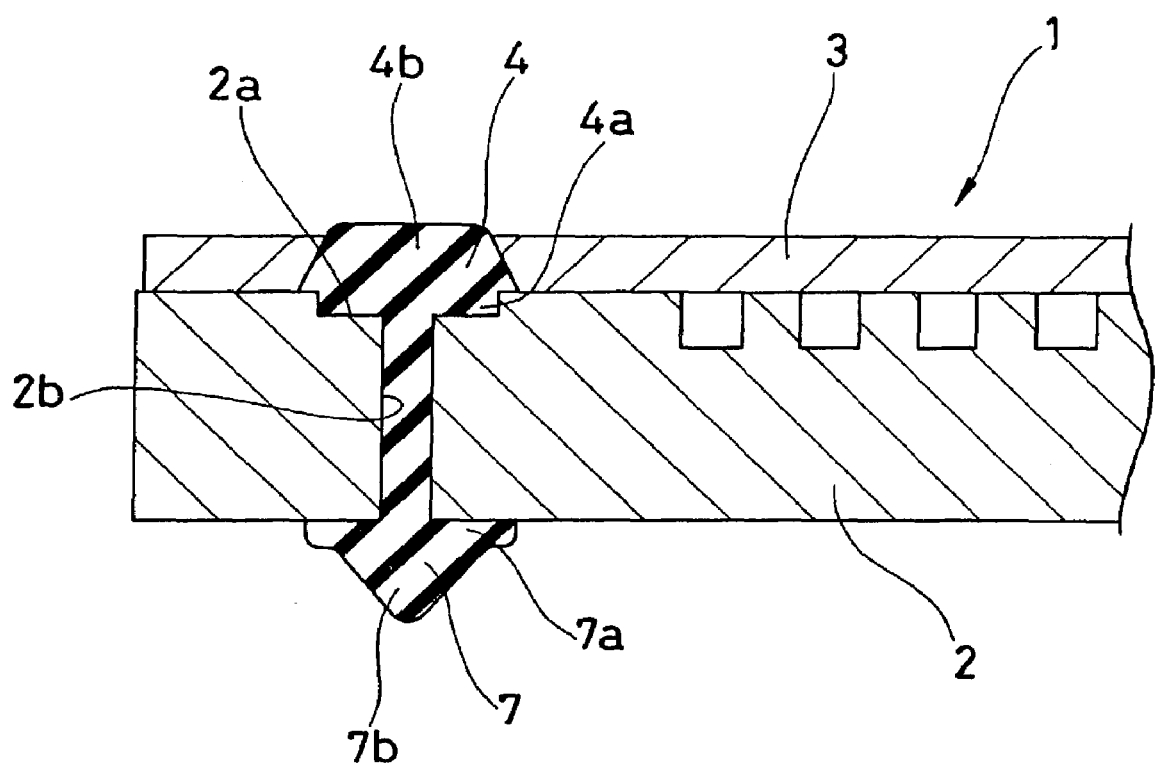
FIG. 7 is a cross sectional view along a line C-C in FIG. 6.

FIG. 6 shows a schematic perspective view of a constituting part 1 for a fuel battery (separator for a fuel battery) in accordance with a third embodiment of the present invention, and a cross sectional view along a line C-C thereof is shown in FIG. 7.

The constituting part 1 for the fuel battery in accordance with the present embodiment is structured in the following manner.

That is, at first, a separator (separator main body) 2 constituted by a carbon plate having a predetermined thickness is provided, a gas diffusion layer 3 made of a carbon fiber and a gasket 4 made of a liquid rubber cured material are integrally formed with one surface of the separator 2, and a gasket 7 made of a liquid rubber cured material is integrally formed with an opposite surface of the separator 2.

One gasket 4 provided on one surface of the separator 2 is integrally provided with a flat base portion 4a received in a receiving groove 2a provided on one surface of the separator 2, and a lip portion 4b having a substantially trapezoidal cross sectional shape and integrally formed with the base portion 4a, and another gasket 7 provided on the opposite surface of the separator 2 is integrally provided with a flat base portion 7a, and a lip portion 7b having a substantially triangular cross sectional shape and integrally formed with the base portion 7a.

A pair of gaskets 4 and 7 are integrated with the separator 2 without any adhesive agent in accordance that a part of the liquid rubber impregnated into the carbon fiber of the gas diffusion layer 3 at an immediately upper position of the receiving groove 2a passes through a through hole 2b which is previously provided in a bottom surface portion of the receiving groove 2a, and reaches the opposite surface so as to be formed as a double-face gasket. A desired number of through holes 2b are provided so as to be arranged in one line along an extending direction of the gaskets 4 and 7.

Further, the gas diffusion layer 3 is integrated with the separator 2 so as to be held between one gasket 4 and the separator 2 in accordance that a part of the liquid rubber impregnated into the carbon fiber of the gas diffusion layer 3 passes through the through holes 2b and reaches the opposite surface so as to be formed as a double-face gasket.

The gas diffusion layer 3 is formed in a flat shape having substantially the same size and the same shape as those of the separator 2, and an upper surface of a lip portion 4b of one gasket 4 is formed so as to protrude outward from the gas diffusion layer 3.

In the constituting part 1 for the fuel battery, since the separator 2 constituted by the carbon plate, the gas diffusion layer 3 made of the carbon fiber, and a pair of gaskets 4 and 7 made of the liquid rubber cured material are integrally formed with each other as mentioned above, it is possible to reduce steps of assembling these parts with each other at a time of assembling of the fuel battery.

Further, since the liquid rubber forming one gasket 4 is impregnated into the carbon fiber of the gas diffusion layer 3 so as to solidify, thereby being integrally formed with the separator 2 so as to hold the gas diffusion layer 3, there is provided a structure in which the gasket 4 and the gas diffusion layer 3 are closely attached. Accordingly, it is possible to prevent the space forming the shortcut flow passage for the gas, which is formed in the prior art mentioned above, from being formed between the gasket 4 and the gas diffusion layer 3.

Further, since the liquid rubber forming one gasket 4 is impregnated into the carbon fiber of the gas diffusion layer 3 so as to reach the separator 2, whereby the gasket 4 and the separator 2 are directly integrally formed, it is possible to prevent the gas leakage flow passage from being formed between the both elements 2 and 4.

Further, since a pair of gaskets 4 and 7 are integrally formed with the separator 2 without any adhesive agent, it is possible to omit an adhesive agent application step from the steps of manufacturing the constituting part 1 for the fuel battery, so that it is possible to make the manufacturing easy and it is possible to provide a product which is advantageous in view of cost.

Fourth Embodiment

Figure 8:
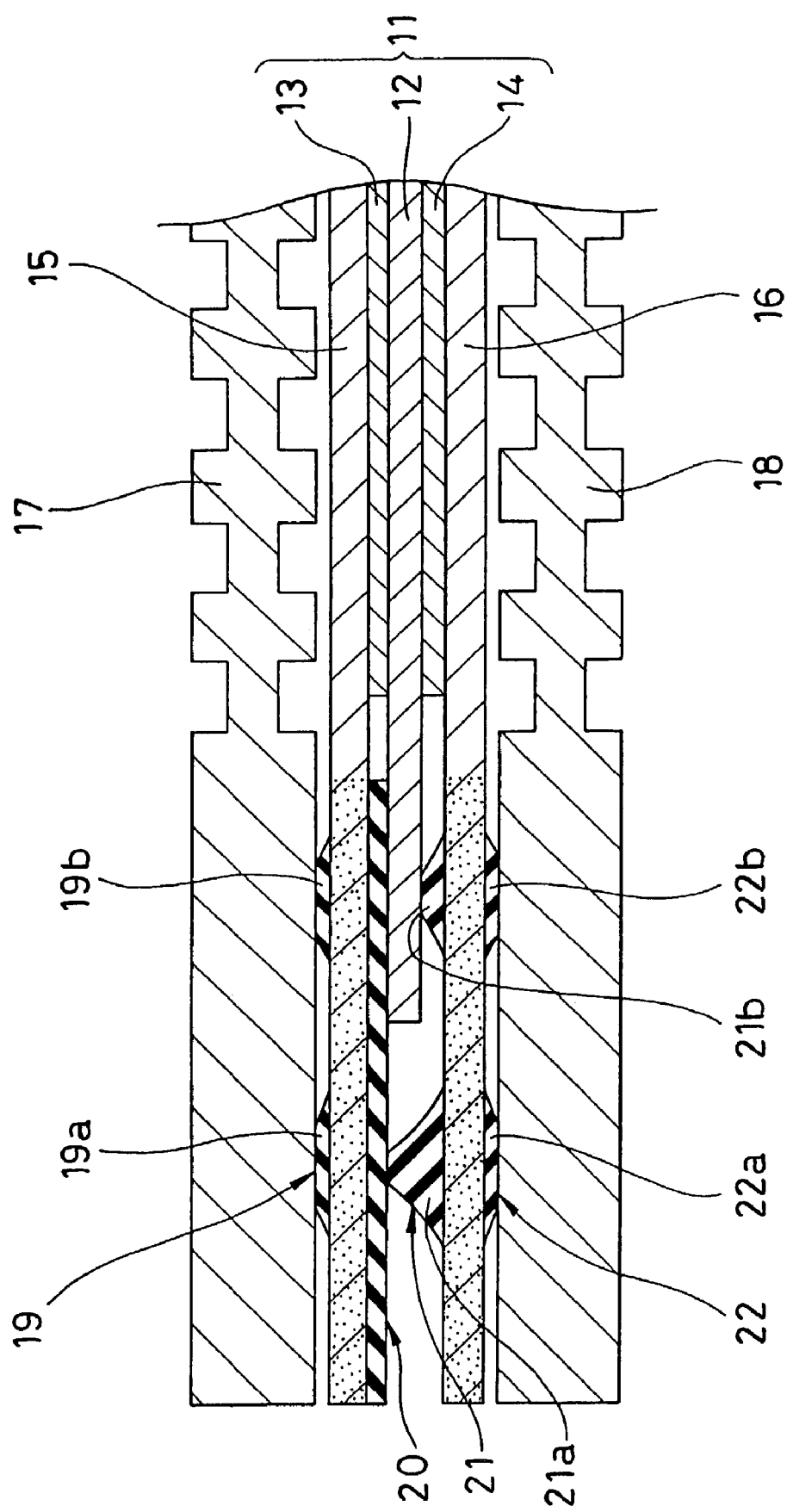
FIG. 8 is a cross sectional view of a constituting part for a fuel battery in accordance with a fourth embodiment of the present invention.

FIG. 8 shows a cross section of a constituting part for a fuel battery (gasket for a fuel battery) in accordance with a fourth embodiment of the present invention, and the constituting part for the fuel battery is structured as follows.

That is, at first, a reaction electrode portion (MEA) 11 in which an electrolyte membrane (ion exchange membrane) 12 and electrodes with catalyst (catalyst layers) 13 and 14 are integrated is provided in the middle in the vertical direction of the drawing, and gas diffusion layers (GDL) 15 and 16 made of a carbon fiber, a metal fiber or the like are respectively layered on both upper and lower sides of the reaction electrode portion 11 in a non-adhesive manner as separate bodies, and separators (collector electrodes) 17 and 18 are respectively layered on both upper and lower sides of the gas diffusion layers 15 and 16, whereby a laminated body corresponding to one cell is constituted.

A peripheral edge portion of the electrolyte membrane 12 protrudes outward in the plane direction beyond the electrodes with catalyst 13 and 14, however, are set to be shorter than the upper and lower gas diffusion layers 15 and 16, and gaskets (seal gaskets) 19, 20, 21 and 22 are integrally formed with both surfaces of the peripheral edge portions of the upper and lower gas diffusion layers 15 and 16, respectively.

Among them, at first, the gasket 19 in the side of the separator 17 of the upper gas diffusion layer 15 in the drawing has an outer lip 19a and an inner lip 19b so as to constitute a double-lip structure, and both of the lips 19a and 19b are closely attached to the separator 17. The gasket 20 in the side of the reaction electrode portion 11 of the upper gas diffusion layer 15 in the drawing is formed in a flat shape so as to form a flat seal structure, and is closely attached to the electrolyte membrane 12 by a part of an inner side thereof. Since the gas diffusion layer 15 has a porous structure, both of the gaskets 19 and 20 are formed by being impregnated with a liquid silicone rubber, and accordingly are integrally formed with each other.

Further, the gasket 21 in the side of the reaction electrode portion 11 of the lower gas diffusion layer 16 in the drawing has an outer lip 21a and an inner lip 21b so as to constitute a double-lip structure, and the outer lip 21a is closely attached to the flat seal of the gasket 20, and the inner lip 21b is closely attached to the electrolyte membrane 12. The inner lip 21b is formed so that a height thereof is smaller than that of the outer lip 21a at a thickness of the electrolyte membrane 12. The gasket 22 in the side of the separator 18 of the lower gas diffusion layer 16 in the drawing has an outer lip 22a and an inner lip 22b so as to constitute a double-lip structure, and both of the lips 22a and 22b are closely attached to the separator 18. Since the gas diffusion layer 16 has a porous structure, both of the gaskets 21 and 22 are formed by being impregnated with a liquid silicone rubber, and accordingly are integrally formed with each other.

Further, a dimension of each of the portions is set as follows.

Thickness of electrolyte membrane 12: 50 to 150 μm
Thickness of gas diffusion layers 15 and 16: 0.5 to 1 mm
Height of lips 19a, 19b, 21a, 22a, 22b: 0.5 mm Thickness of flat seal 20: 0.3 mm Height of lip 21b: 0.4 mm An assembled structure having the structure mentioned above constructs a fuel battery cell as an finished assembly product, and has a feature that the following function and effects can be achieved by the structure mentioned above.

That is, at first, since the reaction electrode portion 11 provided with the electrolyte membrane 12 and the gas diffusion layers 15 and 16 arranged in both surfaces thereof are formed as independent bodies as described above, and the membrane-gaskets 19, 20, 21 and 22 are respectively provided on both surfaces of a pair of gas diffusion layers 15 and 16 holding the independent reaction electrode portion 11 from both sides between the pair, it is possible to replace only the gas diffusion layers 15 and 16 provided with the gaskets 19, 20, 21 and 22 by a substitute with leaving the independent reaction electrode portion 11, when there occurs a necessity of replacing the gas diffusion layers 15 and 16 due to generation of permanent strain or the like. Accordingly, since it is not necessary to replace the reaction electrode portion 12 corresponding to a comparatively expensive part each time, it is possible to reduce a cost for parts and a cost for maintenance. A replacing operation can be significantly easily executed.

Further, totally four sets of gaskets 19, 20, 21 and 22 are provided on both upper and lower surfaces of a pair of gas diffusion layers 15 and 16 holding the reaction electrode portion 11 formed as the independent structure with no adhesion from both sides thereof, a seal portion of the cell is structured by a combination of the gas diffusion layers 15 and 16 and the gaskets 19, 20, 21 and 22, and the electrolyte membrane 12 is received in side the seal portion. Accordingly, since a plane area of the electrolyte membrane 12 corresponding to the comparatively expensive part can be made smaller in comparison with the conventional one, it is possible to reduce the cost for parts at this degree.

Further, in addition thereto, since the respective gaskets 19, 21 and 22 are formed in the double-lip structure, it is possible to achieve an excellent seal performance, and since the gasket 20 is formed in the flat seal structure, it is possible to restrict a deformation of the electrolyte membrane 12 pressed and contacted thereby to a small level.

Fifth Embodiment

Figure 9:
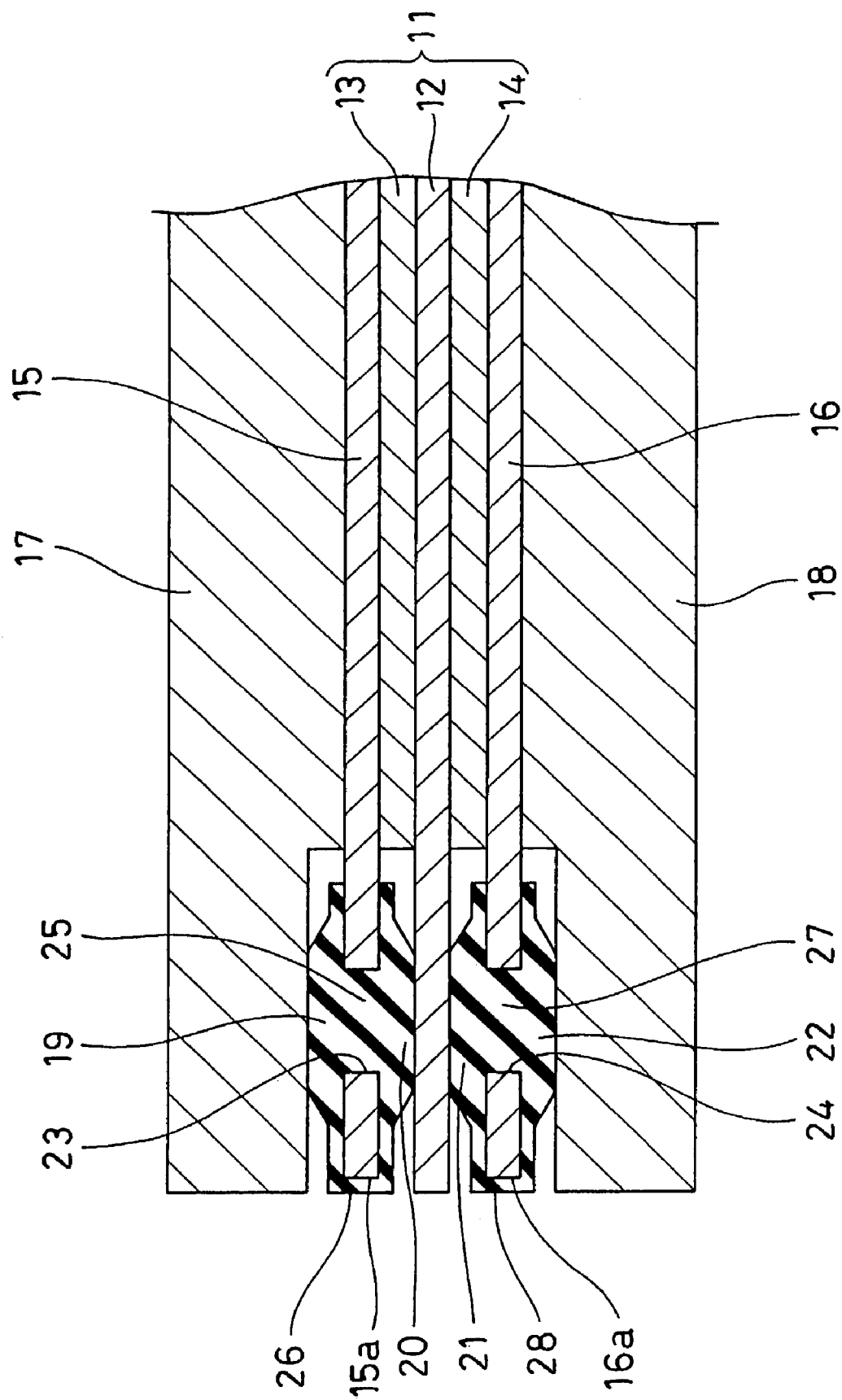
FIG. 9 is a cross sectional view of a constituting part for a fuel battery in accordance with a fifth embodiment of the present invention.

FIG. 9 shows a cross section of a constituting part for a fuel battery (gasket for a fuel battery) in accordance with a fifth embodiment of the present invention, and the constituting part for the fuel battery is structured as follows.

That is, at first, a reaction electrode portion (MEA) 11 in which an electrolyte membrane (ion exchange membrane) 12 and electrodes with catalyst (catalyst layers) 13 and 14 are integrated is provided in the middle in a vertical direction of the drawing, and gas diffusion layers (GDL) 15 and 16 made of a carbon fiber, a metal fiber or the like are respectively layered on both upper and lower sides of the reaction electrode portion 11 in a non-adhesive manner, and separators (collector electrodes) 17 and 18 are respectively layered on both upper and lower sides of the gas diffusion layers 15 and 16, whereby a laminated body corresponding to one cell is constituted.

A peripheral edge portion of the electrolyte membrane 12 protrudes outward in the plane direction beyond the electrodes with catalyst 13 and 14, and are set to be the same length (plane area) as that of the upper and lower gas diffusion layers 15 and 16, a desired number of through holes 23 and 24 extending through in the thickness direction are respectively provided in the peripheral edge portions of the upper and lower gas diffusion layers 15 and 16, and the gaskets 19, 20, 21 and 22 are integrally formed with both surfaces of the gas diffusion layers 15 and 16 via the through holes 23 and 24 in a non-adhesive manner.

The gaskets 19 and 20 integrally formed with the upper gas diffusion layer 15 in the drawing are structured such that the upper gasket 19 closely attached to the upper separator 17, and the lower gasket 20 closely attached to the electrolyte membrane 12 are integrally formed with each other via a rubber 25 charged into the through hole 23, and a membrane-like covering portion 26 covering an end surface 15a of the gas diffusion layer 15 is integrally formed so as to cover a whole of the peripheral edge portion of the gas diffusion layer 15.

Further, the gaskets 21 and 22 integrally formed with the lower gas diffusion layer 16 in the drawing are structured such that the upper gasket 21 closely attached to the electrolyte membrane 12, and the lower gasket 22 closely attached to the lower separator 18 are integrally formed with each other via a rubber 27 charged into the through hole 24, and a membrane-like covering portion 28 covering an end surface 16a of the gas diffusion layer 16 is integrally formed so as to cover a whole of the peripheral edge portion of the gas diffusion layer 16.

These gaskets 19, 20, 21 and 22 are formed by a liquid rubber capable of executing an injection molding at a low pressure, and a hardness of the rubber is set to about Hs 20 to 60.

An assembled structure having the structure mentioned above constructs a fuel battery cell as an finished assembly product, and has a feature that the following functions and effects can be achieved by the structure mentioned above.

That is, at first, since the reaction electrode portion 11 provided with the electrolyte membrane 12 and the gas diffusion layers 15 and 16 arranged in both surfaces thereof are formed as independent bodies as described above, the through holes 23 and 24 are provided near the peripheral edge portions of a pair of gas diffusion layers 15 and 16 holding the independent reaction electrode portion 11 from both sides thereof, and the gaskets 19, 20, 21 and 22 are integrally formed with both surfaces of the gas diffusion layers 15 and 16 via the through holes 23 and 24, it is possible to replace only the gas diffusion layers 15 and 16 with which the gaskets 19, 20, 21 and 22 are integrally formed by a substitute with leaving the independent reaction electrode portion 11, when there occurs a necessity of replacing the gas diffusion layers 15 and 16 due to generation of permanent strain or the like. Accordingly, since it is not necessary to replace the electrolyte membrane 12 corresponding to a comparatively expensive part each time, it is possible to reduce a cost for parts and a cost for maintenance. A replacing operation can be significantly easily executed.

Further, in addition thereto, since the gaskets 19, 20, 21 and 22 are formed so as to cover the peripheral edge portions of the gas diffusion layers 15 and 16 by the covering portions 26 and 28 integrally formed therewith, particularly cover the end surfaces 15a and 16a of the gas diffusion layers 15 and 16, it is possible to prevent the sealed fluid from permeating through the gas diffusion layers 15 and 16 so as to leak in the direction to the end surfaces 15a and 16a thereof. Accordingly, it is possible to provide the constituting part for the fuel battery which can achieve an excellent seal property in the direction to the end surface.

Figure 10:
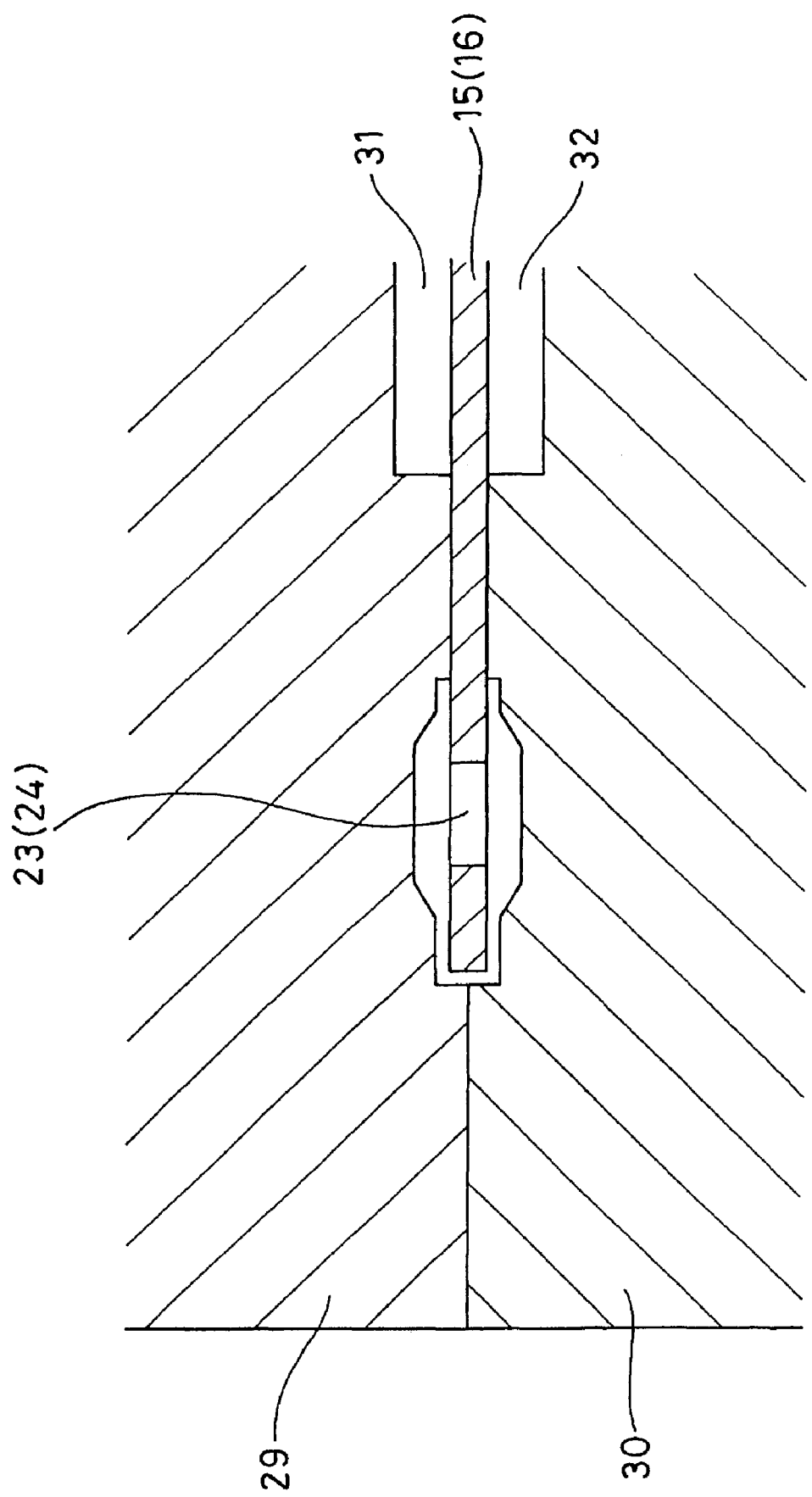
FIG. 10 is a cross sectional view of a main portion of a molding machine for forming the constituting part for the fuel battery.

In this case, a LIM molding machine is used in forming the constituting part for the fuel battery. As shown in FIG. 10, recess portions 31 and 32 are provided in parting portions of mold plates 29 and 30, and the mold is clamped only in portions near the peripheral edge portions of the gas diffusion layers 15 and 16 at a time of forming. In accordance with this structure, it is possible to execute the molding without compressing the porous portions on the reaction surfaces of the gas diffusion layers 15 and 16 requiring a gas diffusion function.

Sixth Embodiment

Figure 11:
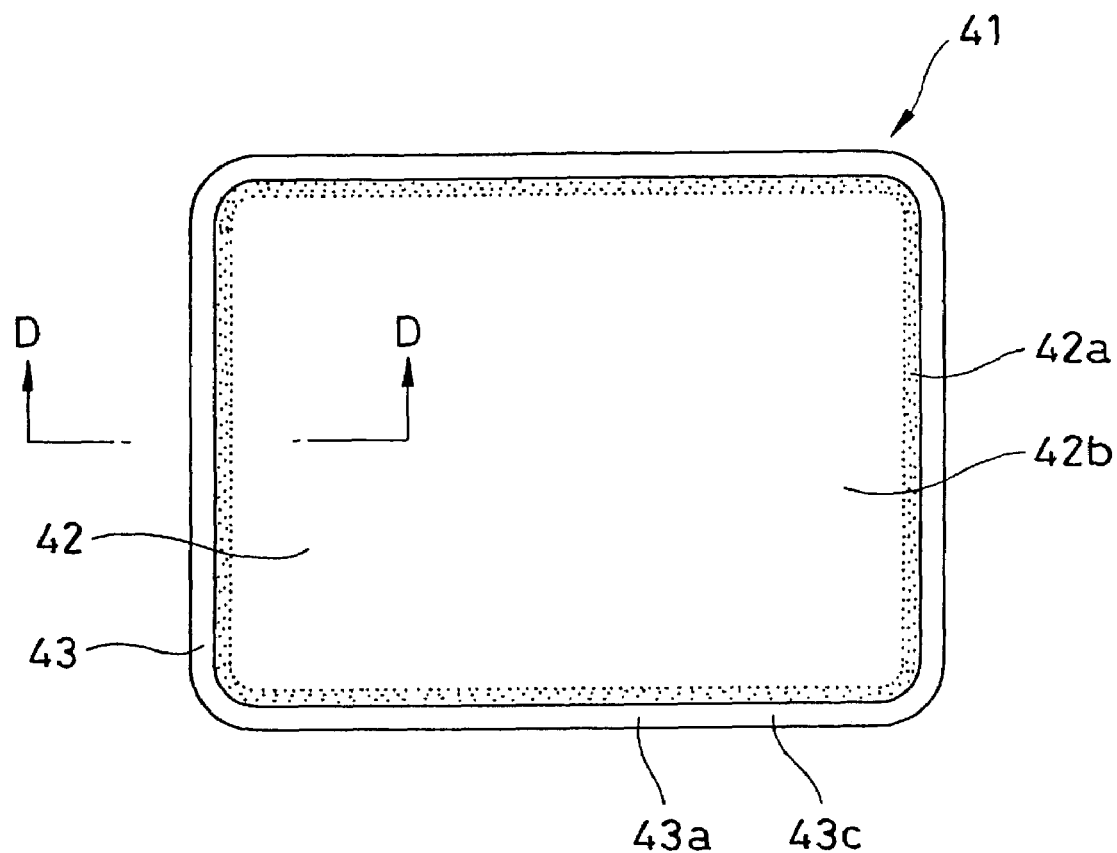
FIG. 11 is a plan view of a constituting part for a fuel battery in accordance with a sixth embodiment of the present invention.
Figure 12:
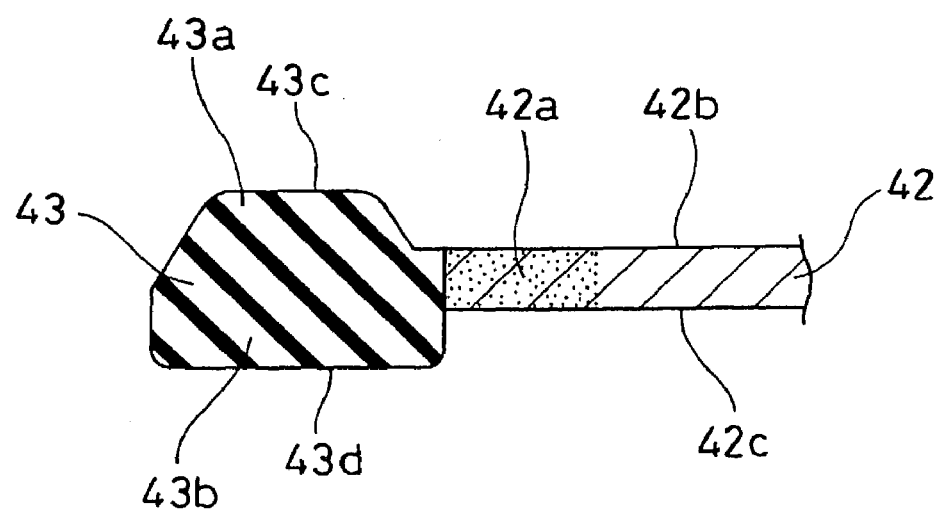
FIG. 12 is an enlarged cross sectional view along a line D-D in FIG. 11.

FIG. 11 shows a plan view of a constituting part 41 for a fuel battery in accordance with a sixth embodiment of the present invention, and an enlarged cross sectional view along a line D-D thereof is shown in FIG. 12.

The constituting part 41 for the fuel battery in accordance with the present embodiment is an integrated product of a gas diffusion layer 42 and a gasket 43, and is structured as follows.

That is, at first, the flat gas diffusion layer 42 provided with a predetermined plane shape is provided, and the gasket 43 is arranged in an outer side (left side in FIG. 12) of an outer peripheral edge portion 42a in the gas diffusion layer 42 all around the periphery.

The gas diffusion layer 42 is formed by a carbon fiber, the gasket 43 is formed by a liquid rubber cured material, and a part of the liquid rubber forming the gasket 43 is impregnated in the outer peripheral edge portion 42a of the gas diffusion layer 42, whereby the gas diffusion layer 42 and the gasket 43 are integrated. In the drawing, as a matter of convenience for explanation, dots are attached to the impregnated portions.

The gasket 43 is formed as a double-face seal type gasket respectively provided with seal lips 43a and 43b on both upper and lower surfaces thereof, a height position of a seal surface 43c of the upper seal lip 43a is set to be above a height position of an upper surface 42b of the gas diffusion layer 42, and a height position of a seal surface 43d of the lower seal lip 43b is set to be below a height position of a lower surface 42c of the gas diffusion layer 42. Accordingly, the gas diffusion layer 42 is arranged within a height area of the gasket 43 and is arranged inside and on the side surface of the gasket 43, whereby the gas diffusion layer 42 and the seal lips 43a and 43b of the gasket 43 are arranged so as not to vertically overlap on the plane.

In the constituting part 41 for the fuel battery provided with the structure mentioned above, since the gas diffusion layer 42 and the seal lips 43a and 43b of the gasket 43 are arranged so as not to vertically overlap on the plane as mentioned above, the gas diffusion layer 42 is not positioned immediately below or immediately above the seal lips 43a and 43b of the gasket 43, whereby it is possible to restrict the permanent compression strain generated in the gasket 43 to a smaller level than the prior art.

Seventh Embodiment

Figure 13:
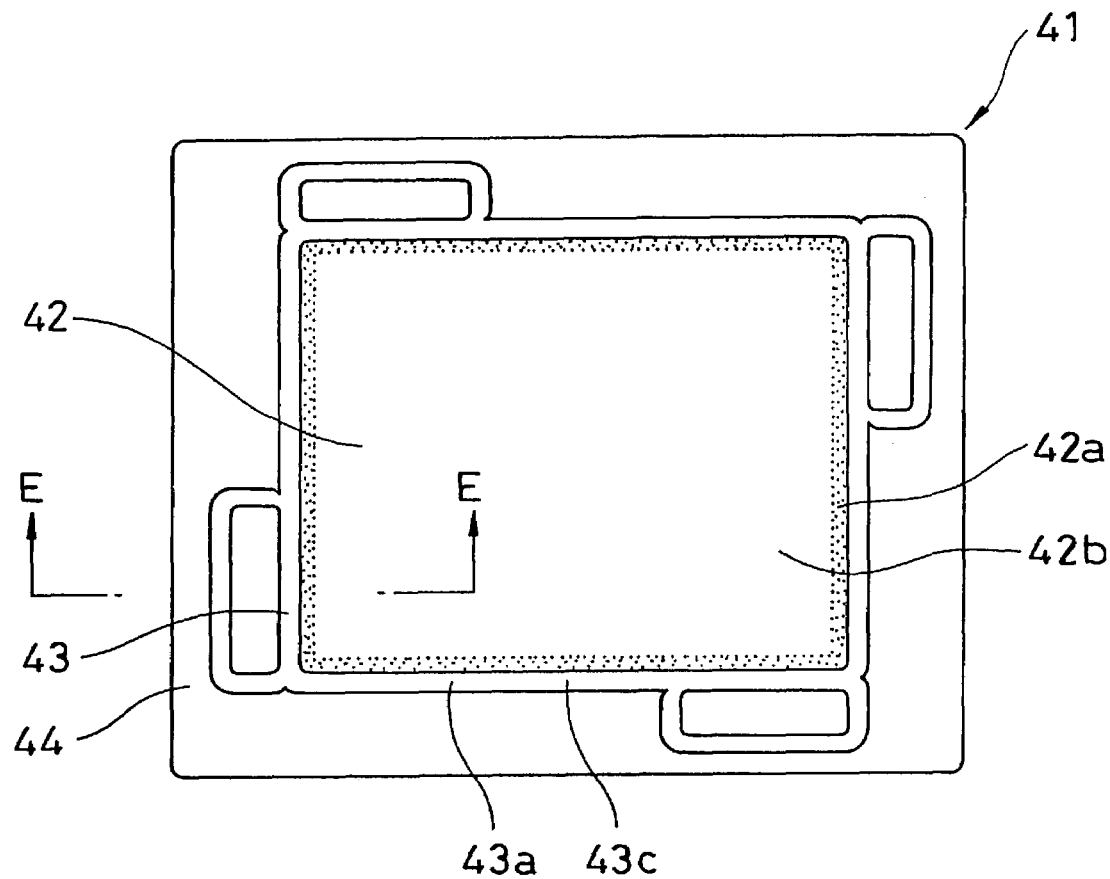
FIG. 13 is a plan view of a constituting part for a fuel battery in accordance with a seventh embodiment of the present invention.
Figure 14:
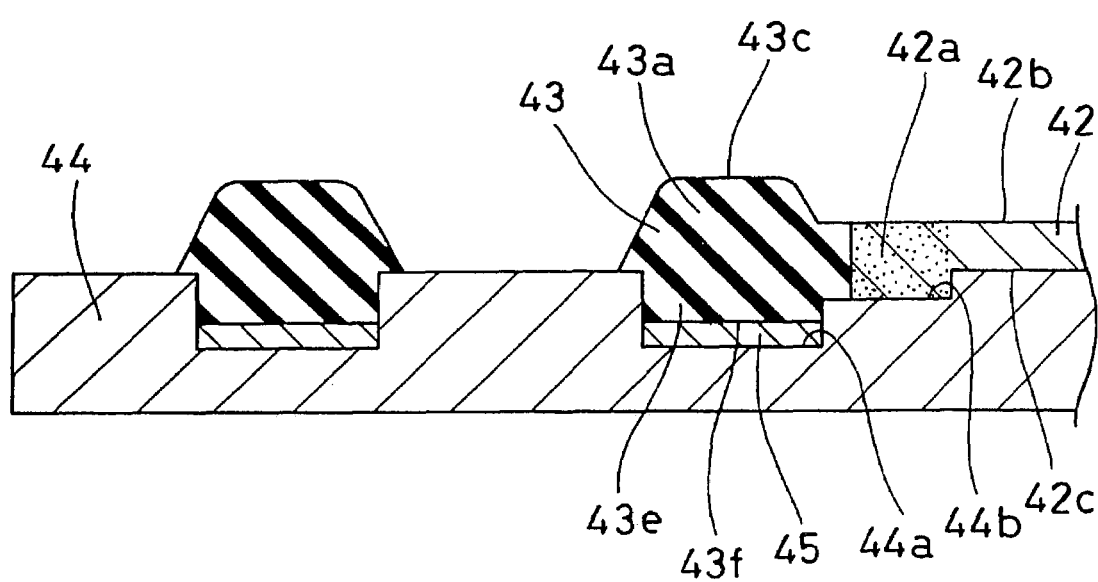
FIG. 14 is an enlarged cross sectional view along a line E-E in FIG. 13.
Figure 15:
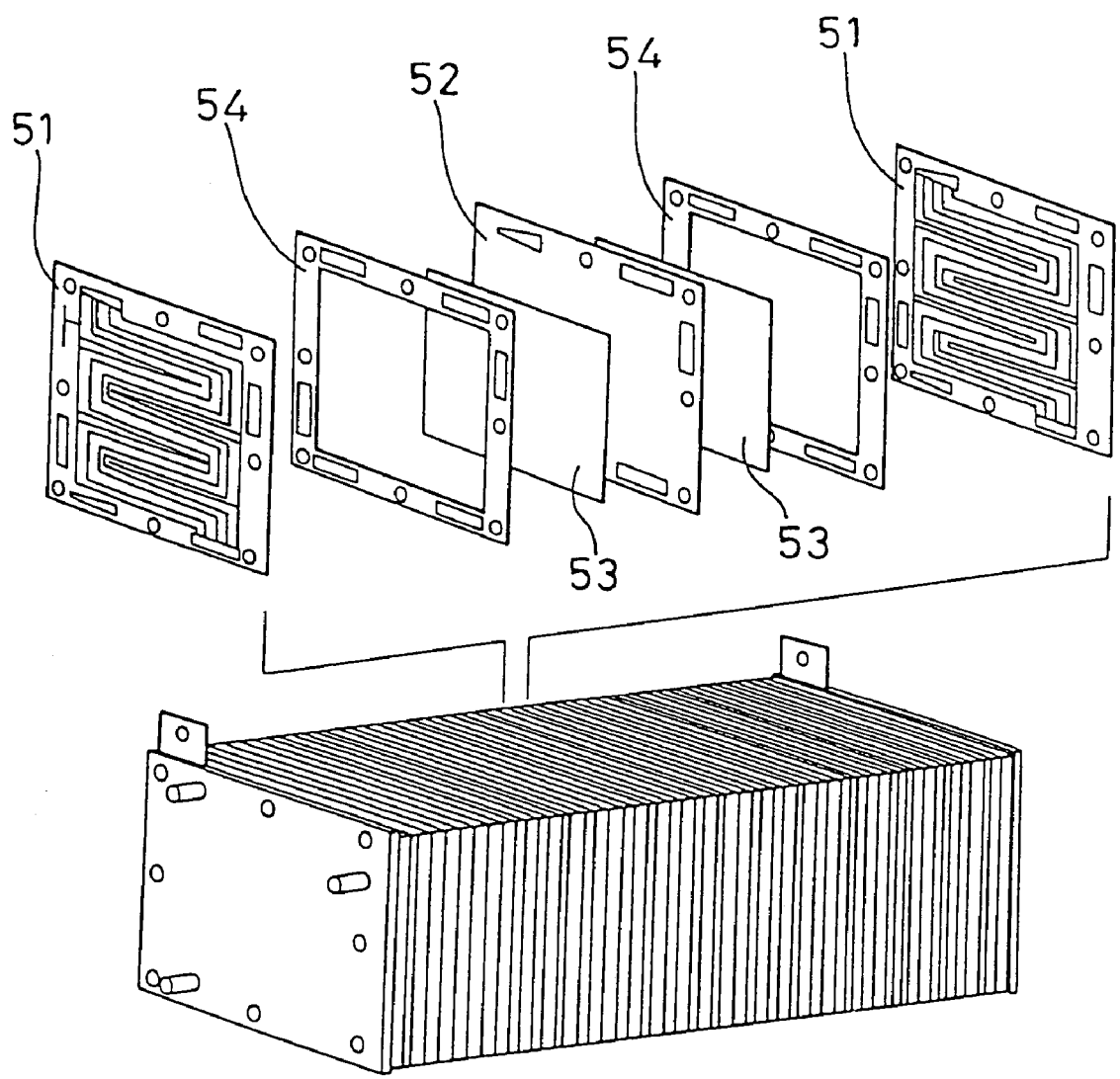
FIG. 15 is a schematic view of a structure of a fuel battery in accordance with a conventional art.
Figure 16:
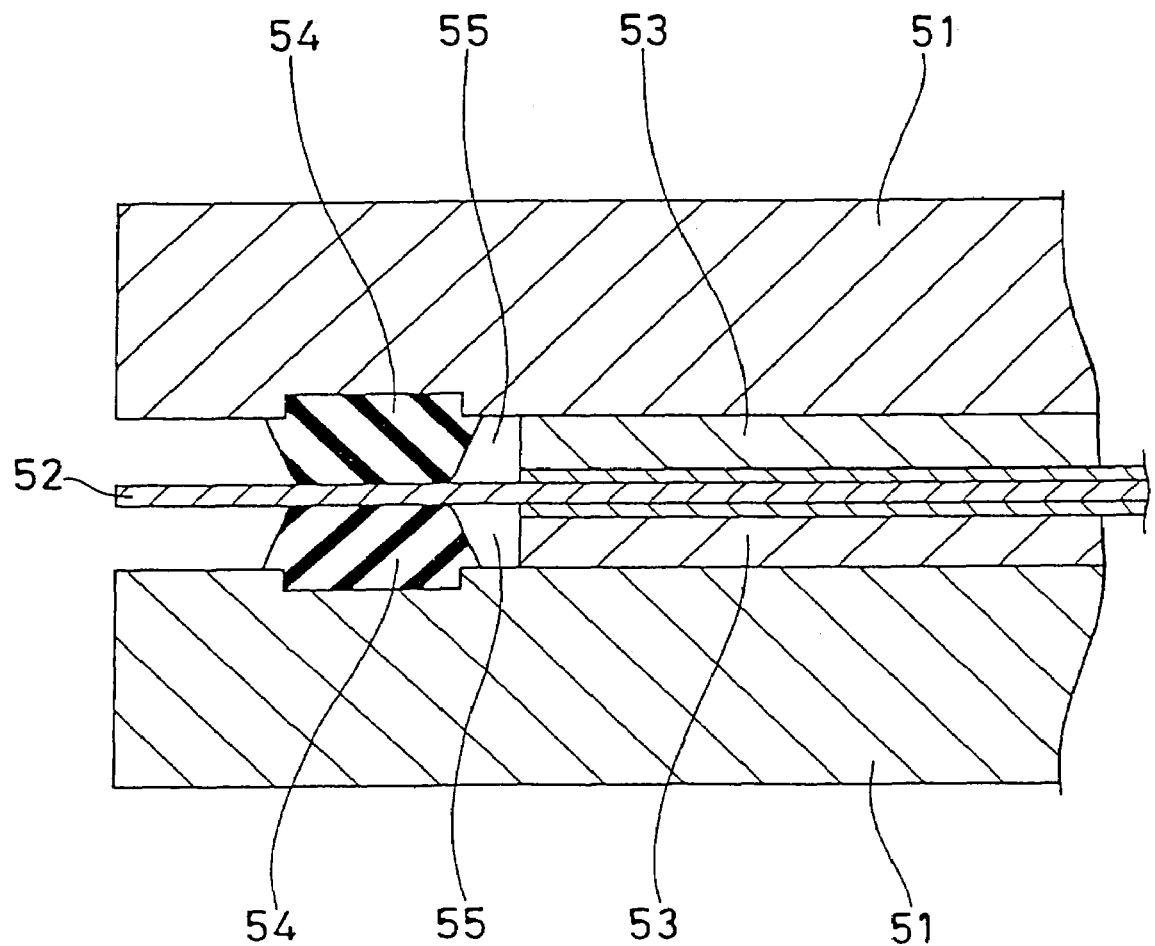
FIG. 16 is a cross sectional view of a main portion showing an assembling state of a constituting part for the fuel battery in accordance with the conventional art.
Figure 17:
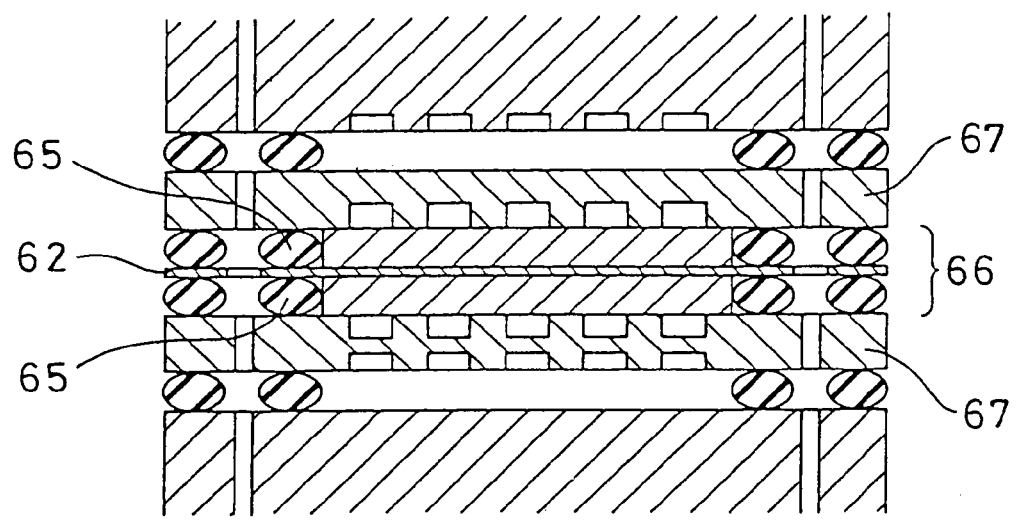
FIG. 17 is a cross sectional view of a fuel battery in accordance with another conventional art.
Figure 18:
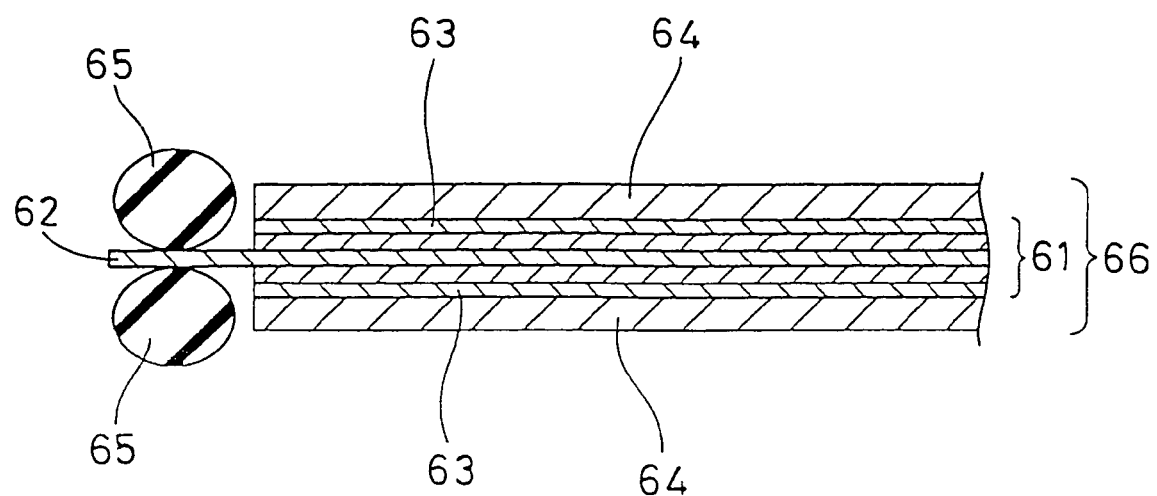
FIG. 18 is an enlarged view of a main portion in FIG. 17.

FIG. 13 shows a plan view of a constituting part 41 for a fuel battery in accordance with a seventh embodiment of the present invention, and an enlarged cross sectional view along a line E-E thereof is shown in FIG. 14.

The constituting part 41 for the fuel battery in accordance with the present embodiment is an integrated product of a gas diffusion layer 42, a gasket 43 and a separator 44, and is structured as follows.

That is, at first, the flat gas diffusion layer 42 provided with a predetermined plane shape is provided, and the gasket 43 is arranged in an outer side (left side in FIG. 14) of an outer peripheral edge portion 42a in the gas diffusion layer 42 all around the periphery, and the gas diffusion layer 42 and the gasket 43 are layered on one surface side (upper surface side in FIG. 14) of the separator 44.

The gas diffusion layer 42 is formed by a carbon fiber, the gasket 43 is formed by a liquid rubber cured material, and the separator 44 is formed by a carbon plate. Further, a part of the liquid rubber forming the gasket 43 is impregnated in the outer peripheral edge portion 42a of the gas diffusion layer 42, whereby the gas diffusion layer 42 and the gasket 43 are integrated (in the drawing, as a matter of convenience for explanation, dots are attached to the impregnated portions), and a part of the liquid rubber reacts with an adhesive agent 45 applied to the separator 44, whereby the gasket 43 and the separator 44 are integrated.

The gasket 43 is formed as a one-face seal type gasket provided with a seal lip 43a on an upper surface thereof, and a mounting portion 43e to the separator 44 is provided on a lower surface thereof. A height position of a seal surface 43c of the seal lip 43a is set to be above a height position of an upper surface 42b of the gas diffusion layer 42, and a height position of a mounting surface 43f of the mounting portion 43e is set to be below a height position of a lower surface 42c of the gas diffusion layer 42. Accordingly, the gas diffusion layer 42 is arranged within a height area of the gasket 43 and is arranged inside and on the side surface of the gasket 43, whereby the gas diffusion layer 42 and the seal lip 43a of the gasket 43 are arranged so as not to vertically overlap on the plane.

Further, a groove-like recess portion 44a for fixing the gasket 43 by applying the adhesive agent 45 is provided on one surface of the separator 44, and a step portion 44b for facilitating to position the gas diffusion layer 42 is provided inside the recess portion 44a.

In the constituting part 41 for the fuel battery provided with the structure mentioned above, since the gas diffusion layer 42 and the seal lip 43a of the gasket 43 are arranged so as not to vertically overlap on the plane as mentioned above, the gas diffusion layer 42 is not positioned immediately below the seal lip 43a of the gasket 43. Accordingly, it is possible to restrict the permanent compression strain generated in the gasket 43 to a smaller level than the prior art.

EFFECT OF THE INVENTION AND INDUSTRIAL APPLICABILITY

The present invention achieves the following effects.

That is, at first, in the constituting part for the fuel battery in accordance with the first aspect of the present invention provided with the structure mentioned above, since the separator made of the carbon plate or the like, the gas diffusion layer made of the carbon fiber or the like, and the gasket made of the liquid rubber cured material or the like are integrally formed, it is possible to reduce the number of steps of assembling the parts with each other at a time of assembling of the fuel battery. Accordingly, it is possible to make the assembling operation of the fuel battery easy. Further, since they are integrated, it is possible to significantly improve the seal property of the gasket portion mounted to the gas diffusion layer.

Further, in the constituting part for the fuel battery in accordance with the second aspect of the present invention provided with the structure mentioned above, since the gasket made of the liquid rubber cured material or the like is integrally formed with one surface in the side of the gas diffusion layer of the integrated product of the separator made of the carbon plate or the like and the gas diffusion layer made of the carbon fiber or the like, it is possible to reduce the number of steps of assembling the parts with each other at a time of assembling of the fuel battery. Accordingly, it is possible to make the assembling operation of the fuel battery easy. Further, since they are integrated, it is possible to significantly improve the seal property of the gasket portion mounted to the gas diffusion layer.

Further, in the constituting part for the fuel battery in accordance with the third aspect of the present invention provided with the structure mentioned above, since the gasket made of the liquid rubber cured material or the like is integrally formed with one surface in the side of the gas diffusion layer of the integral product of the separator made of the carbon plate or the like and the gas diffusion layer made of the carbon fiber or the like, and the gasket is integrally formed with the opposite surface, it is possible to reduce the number of steps of assembling the parts with each other at a time of assembling of the fuel battery. Accordingly, it is possible to make the assembling operation of the fuel battery easy. Further, since they are integrated, it is possible to significantly improve the seal property of the gasket portion mounted to the gas diffusion layer. The invention in accordance with the present aspect provides the integrated product of the double-face gasket.

Further, in addition thereto, in the constituting part for the fuel battery in accordance with the fourth aspect of the present invention provided with the structure mentioned above, since the adhesive agent is applied to the separator, and the rubber of the gasket permeating into the gas diffusion layer is reacted with the adhesive agent on the separator, thereby being integrally formed in such a manner as to hold the gas diffusion layer therein, the structure in which the gasket and the gas diffusion layer are closely attached is provided, and it is possible to prevent the space forming the shortcut flow passage for the gas from being formed between the gasket and the gas diffusion layer. Accordingly, it is possible to improve a diffusion property of the gas, whereby it is possible to improve an efficiency of power generation of the fuel battery.

Further, since the rubber of the gasket permeates into the gas diffusion layer so as to reach the separator, whereby the gasket and the separator are integrate, it is possible to prevent the gas leakage flow passage form being formed, whereby it is possible to improve a seal property.

Further, in the constituting part for the fuel battery in accordance with the fifth aspect of the present invention provided with the structure mentioned above, since the adhesive agent is also applied to the separator, and the rubber of the gasket permeating into the gas diffusion layer is reacted with the adhesive agent on the separator, thereby being integrally formed in such a manner as to hold the gas diffusion layer therein, the structure in which the gasket and the gas diffusion layer are closely attached is provided, and it is possible to prevent the space forming the shortcut flow passage for the gas from being formed between the gasket and the gas diffusion layer. Accordingly, it is possible to improve a diffusion property of the gas, whereby it is possible to improve an efficiency of power generation of the fuel battery.

Further, since the rubber of the gasket permeates into the gas diffusion layer so as to reach the separator, whereby the gasket and the separator are integrated, it is possible to prevent the gas leakage flow passage form being formed, whereby it is possible to improve a seal property.

Further, since the adhesive agent is applied also to the opposite surface and the gasket is integrally formed, in accordance with the invention of the present aspect, the integrated product of the double-face gasket can be provided.

Further, in the constituting part for the fuel battery in accordance with the sixth aspect of the present invention provided with the structure mentioned above, since the through hole is provided in the separator, and a part of the rubber penetrating into the gas diffusion layer passes through the through hole so as to reach the opposite surface, whereby the gasket is integrally formed on both surfaces of the separator, the structure in which the gasket and the gas diffusion layer are closely attached is provided, and it is possible to prevent the space forming the shortcut flow passage for the gas from being formed between the gasket and the gas diffusion layer. Accordingly, it is possible to improve a diffusion property of the gas, whereby it is possible to improve an efficiency of power generation of the fuel battery.

Further, since the rubber of the gasket permeates into the gas diffusion layer so as to reach the separator, whereby the gasket and the separator are integrated, it is possible to prevent the gas leakage flow passage form being formed, whereby it is possible to improve a seal property.

Further, since the gasket is integrally formed with both surfaces of the separator, in accordance with the invention of the present aspect, the integrated product of the double-face gasket can be provided.

Further, in the constituting part for the fuel battery in accordance with the seventh aspect of the present invention provided with the structure mentioned above, since the electrolyte membrane and the gas diffusion layer are formed as the independent bodies, and the gaskets are respectively provided on both surfaces of a pair of gas diffusion layers holding the independent electrolyte membrane from both sides thereof between the pair, it is possible to replace only the gas diffusion layer provided with the gasket by a substitute with leaving the electrolyte membrane independent from the gas diffusion layer. Accordingly, since it is not necessary to replace the electrolyte membrane corresponding to the comparatively expensive part each time, it is possible to reduce the cost for parts and the cost for maintenance.

Further, in the constituting part for the fuel battery in accordance with the seventh aspect of the present invention, the seal portion of the fuel battery cell is constituted by the combination of the gas diffusion layer and the gasket, and the electrolyte membrane is received inside the seal portion. Accordingly, since the plane area of the electrolyte membrane corresponding to the comparatively expensive part can be made smaller in comparison with the conventional one, it is possible to reduce the cost for parts at that degree.

Further, in addition thereto, in the constituting part for the fuel battery in accordance with the eighth aspect of the present invention provided with the structure mentioned above, since the gasket is formed in the double lip structure in the side of the separator in one gas diffusion layer, and in the side of the electrolyte membrane and the side of the separator in another gas diffusion layer, it is possible to achieve an excellent seal performance, and since the gasket is formed in the flat seal structure in the side of the electrolyte membrane in one gas diffusion layer, it is possible to restrict the deformation of the electrolyte membrane pressed and contacted thereby to a small level.

Further, in the constituting part for the fuel battery in accordance with the ninth aspect of the present invention provided with the structure mentioned above, since the gasket is formed by being impregnated with the liquid rubber into the porous structure of the gas diffusion layer, it is possible to firmly and easily integrate the gasket with the gas diffusion layer.

Further, in the constituting part for the fuel battery in accordance with the tenth aspect of the present invention provided with the structure mentioned above, since the electrolyte membrane and the gas diffusion layer are formed as the separate bodies, the through hole is provided near the peripheral edge portion of a pair of gas diffusion layers holding the independent electrolyte membrane therein from both sides thereof, and the gasket is integrally formed on both surfaces of the gas diffusion layer via the through hole, it is possible to replace only the gas diffusion layer provided with the gasket by a substitute with leaving the electrolyte membrane independent from the gas diffusion layer. Accordingly, since it is not necessary to replace the electrolyte membrane corresponding to the comparatively expensive part each time, it is possible to reduce the cost for parts and the cost for maintenance.

Further, in addition thereto, in the constituting part for the fuel battery in accordance with the eleventh aspect of the present invention provided with the structure mentioned above, since the gasket covers the peripheral edge portion of the gas diffusion layer, and particularly covers the end surface of the gas diffusion layer, it is possible to prevent the sealed fluid from permeating through the gas diffusion layer so as to leak in the direction to the end surface thereof. Accordingly, it is possible to provide the constituting part for the fuel battery which achieves an excellent seal property with respect to the direction to the end surface.

Further, in the constituting part for the fuel battery in accordance with the twelfth aspect to the fifteenth aspect of the present invention provided with the structure mentioned above, since the gas diffusion layer and the seal lip of the gasket are arranged so as not to be overlapped with each other in view of a plane, the gas diffusion layer is not positioned immediately below the seal lip of the gasket, whereby it is possible to restrict the permanent compression strain generated in the gasket to be smaller than the conventional one. Accordingly, it is possible to provide the constituting part for the fuel battery in which the number of steps of assembling of the fuel battery can be reduced, due to the integrated product of the gas diffusion layer and the gasket, or the integrated product of the gas diffusion layer, the gasket and the separator, and in addition, the permanent compression strain generated in the gasket can be restricted to be small.

What is claimed is:

1. A fuel cell comprising:
   a pair of spaced gas diffusion layers;
   a membrane electrode assembly interposed between said pair of gas diffusion layers;
   a pair of separators, each one of said pair of separators being superposed on one of said pair of gas diffusion layers on a surface of the gas diffusion layers facing away from the membrane electrode assembly; and
   a plurality of gaskets;
   said plurality of gaskets being integral with opposite surfaces of both of the pair of gas diffusion layers to connect the membrane electrode assembly with the gas diffusion layers and to connect the gas diffusion layers with the pair of separators so that the gas diffusion layers are removable and replaceable due to permanent deformation of the plurality of gaskets while the membrane electrode assembly and the separators can continue to be used after replacement of the gas diffusion layers, and
   some of the plurality of gaskets being located on surfaces of the pair of gas diffusion layers facing the pair of separators and on one surface of the pair of gas diffusion layers facing the membrane electrode assembly, the plurality of gaskets being located respectively between one of the pair of separators and one of the pair of gas diffusion layers having a double lip structure, said double lip structure including an inner lip and an outer lip spaced from and separate from the inner lip, and
   one of the plurality of gaskets located on the other surface of one of the pair of the gas diffusion layers and facing the membrane electrode assembly having a flat seal structure; and
   the inner lips of the double lip structure holding and the outer lips sealing the pair of separators and the pair of gas diffusion layers.

* * * * *